(12) United States Patent
Haut et al.

(10) Patent No.: US 10,435,058 B2
(45) Date of Patent: *Oct. 8, 2019

(54) CHILD STROLLER APPARATUS HAVING AN EXPANDABLE FRAME

(71) Applicant: Wonderland Switzerland AG, Steinhausen (CH)

(72) Inventors: Robert E. Haut, Merion Station, PA (US); Andrew J. Taylor, Mohnton, PA (US); Patrick J. Bowers, Hockessin, DE (US); Curtis M. Hartenstine, Birdsboro, PA (US)

(73) Assignee: WONDERLAND SWITZERLAND AG, Steinhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/999,401

(22) Filed: Aug. 20, 2018

(65) Prior Publication Data
US 2019/0009811 A1    Jan. 10, 2019

Related U.S. Application Data

(63) Continuation of application No. 15/414,968, filed on Jan. 25, 2017, now Pat. No. 10,077,063.
(Continued)

(51) Int. Cl.
*B62B 7/10* (2006.01)
*B62B 9/20* (2006.01)
(Continued)

(52) U.S. Cl.
CPC ............... *B62B 7/10* (2013.01); *B62B 7/008* (2013.01); *B62B 7/08* (2013.01); *B62B 7/12* (2013.01);
(Continued)

(58) Field of Classification Search
CPC .. B62B 7/10; B62B 7/008; B62B 7/08; B62B 7/12; B62B 7/142; B62B 7/006;
(Continued)

(56) References Cited

U.S. PATENT DOCUMENTS 6,676,140 B1    1/2004  Gondobintoro
8,070,180 B2 *  12/2011 Stiba ......................... B62B 7/10
                                                    280/47.38
(Continued)

FOREIGN PATENT DOCUMENTS

CN    201371841 Y    12/2009
CN    103072612 A     5/2013
(Continued)

OTHER PUBLICATIONS

OA in copending EP Appl. No. 17153112 dated Jul. 13, 2017.
(Continued)

*Primary Examiner* — John D Walters
(74) *Attorney, Agent, or Firm* — NZ Carr Law Office, PLLC

(57) ABSTRACT

A child stroller apparatus includes a first frame portion provided with a first wheel assembly, a second frame portion provided with a second wheel assembly, the second frame portion being assembled with the first frame portion for sliding movement along a lengthwise axis extending from a front to a rear of the child stroller apparatus, and an expandable storage basket spanning across the first and second frame portions. The storage basket includes a first and a second basket frame portion respectively attached to the first and second frame portion, the first and second basket frame portions being movable away or toward each other for expanding or contracting the storage basket as the
(Continued)

second frame portion slides relative to the first frame portion for increasing or reducing a distance between the first and second wheel assemblies.

20 Claims, 26 Drawing Sheets

Related U.S. Application Data

(60) Provisional application No. 62/290,731, filed on Feb. 3, 2016, provisional application No. 62/329,677, filed on Apr. 29, 2016, provisional application No. 62/356,895, filed on Jun. 30, 2016.

(51) Int. Cl.
<table>
<tr><td>B62B 9/26</td><td>(2006.01)</td></tr>
<tr><td>B62B 7/08</td><td>(2006.01)</td></tr>
<tr><td>B62B 9/12</td><td>(2006.01)</td></tr>
<tr><td>B62B 7/14</td><td>(2006.01)</td></tr>
<tr><td>B62B 7/00</td><td>(2006.01)</td></tr>
<tr><td>B62B 7/12</td><td>(2006.01)</td></tr>
<tr><td>B62B 9/28</td><td>(2006.01)</td></tr>
<tr><td>B60N 2/28</td><td>(2006.01)</td></tr>
</table>

(52) U.S. Cl.
CPC .............. *B62B 7/142* (2013.01); *B62B 9/12* (2013.01); *B62B 9/20* (2013.01); *B62B 9/26* (2013.01); *B62B 9/28* (2013.01); *B60N 2/2848* (2013.01); *B62B 7/006* (2013.01); *B62B 2205/003* (2013.01); *B62B 2205/20* (2013.01); *B62B 2205/30* (2013.01)

(58) Field of Classification Search
CPC .... B62B 9/12; B62B 9/20; B62B 9/28; B62B 2205/003; B62B 2205/20; B62B 2205/30; B60N 2/2848
USPC ................................. 280/650, 657, 658, 647
See application file for complete search history.

(56) References Cited

U.S. PATENT DOCUMENTS

| | | | |
|---|---|---|---|
| 8,905,427 B2* | 12/2014 | Katz | ................... B60B 33/0002 |
| | | | 280/47.38 |
| 9,227,650 B2* | 1/2016 | Gillett | ....................... B62B 7/12 |
| 9,868,456 B2* | 1/2018 | Stiba | ...................... B62B 7/008 |
| 2009/0315300 A1 | 12/2009 | Stiba | |
| 2014/0346756 A1 | 11/2014 | Laffan et al. | |
| 2015/0217792 A1 | 8/2015 | Stiba et al. | |
| 2015/0232114 A1 | 8/2015 | Gillett | |

FOREIGN PATENT DOCUMENTS

| CN | 203172677 U | 9/2013 |
|---|---|---|
| WO | 2009041875 A1 | 4/2009 |

OTHER PUBLICATIONS

OA in co-pending CA Appl. No. 2956197 dated Jan. 29, 2018.
The Aug. 21, 2018 Office Action from co-pending China Patent Application No. 20170060915.5.

* cited by examiner

CHILD STROLLER APPARATUS HAVING AN EXPANDABLE FRAME

CROSS-REFERENCE TO RELATED APPLICATION(S)

This patent application is a continuation of U.S. patent application Ser. No. 15/414,968 filed on Jan. 25, 2017, which respectively claims priority to U.S. Provisional Patent Application No. 62/290,731 filed on Feb. 3, 2016; and to U.S. Provisional Patent Application No. 62/329,677 filed on Apr. 29, 2016; and to U.S. Provisional Patent Application No. 62/356,895 filed on Jun. 30, 2016, the disclosures of which are incorporated herein by reference.

BACKGROUND

1. Field of the Invention

The present invention relates to child stroller apparatuses.

2. Description of the Related Art

Some strollers currently available on the market, such as double strollers, may have an increased volume so that several seats can be installed for receiving more than one child at a time. However, these strollers can be very large and therefore more difficult to maneuver and transport. Owing to its large size, a double stroller is generally not purchased when a first child is born, because it may take a few years before the next child is born. Accordingly, parents generally acquire a single stroller for their first child, and may envisage the purchase of a double stroller only after the birth of the second child. This results in additional expense, and requires space for storing several strollers.

Therefore, there is a need for a child stroller apparatus that is more flexible in use, easy to operate and address at least the foregoing issues.

SUMMARY

The present application describes a child stroller apparatus that is expandable according the needs during use. According to an example of implementation, the child stroller apparatus includes a first frame portion provided with a first wheel assembly, a second frame portion provided with a second wheel assembly, the second frame portion being assembled with the first frame portion for sliding movement along a lengthwise axis extending from a front to a rear of the child stroller apparatus, and an expandable storage basket spanning across the first and second frame portions. The storage basket includes a first and a second basket frame portion respectively attached to the first and second frame portion, the first and second basket frame portions being movable away or toward each other for expanding or contracting the storage basket as the second frame portion slides relative to the first frame portion for increasing or reducing a distance between the first and second wheel assemblies.

According to another example, the child stroller apparatus includes a first frame portion provided with a first wheel assembly, a second frame portion provided with a second wheel assembly, the second frame portion being assembled with the first frame portion for sliding movement along a lengthwise axis extending from a front to a rear of the child stroller apparatus, and a storage basket spanning across the first and second frame portions. The storage basket includes a basket frame portion connected with the second frame portion, and a softgoods material connected with the basket frame portion and defining a sidewall of the storage basket, the basket frame portion being movable relative to the second frame portion between a first position for expanding the sidewall and a second position for collapsing the sidewall.

DETAILED DESCRIPTION OF THE EMBODIMENTS

The present application describes child stroller apparatuses having expandable stroller frames. During use, the stroller frames can be adjusted for increasing or reducing an inner volume of the child stroller apparatuses according to a caregiver's needs. For example, the expanded stroller frame can increase an inner volume of the child stroller apparatus for placement of an additional seat or expanding a storage basket. Moreover, the child stroller apparatuses described herein can include a control mechanism that is easy to operate for adjusting the child stroller apparatus between the expanded state and the shortened state. The control mechanism can be easily accessible for operation at a front or a rear of the child stroller apparatus.

Figure 1:
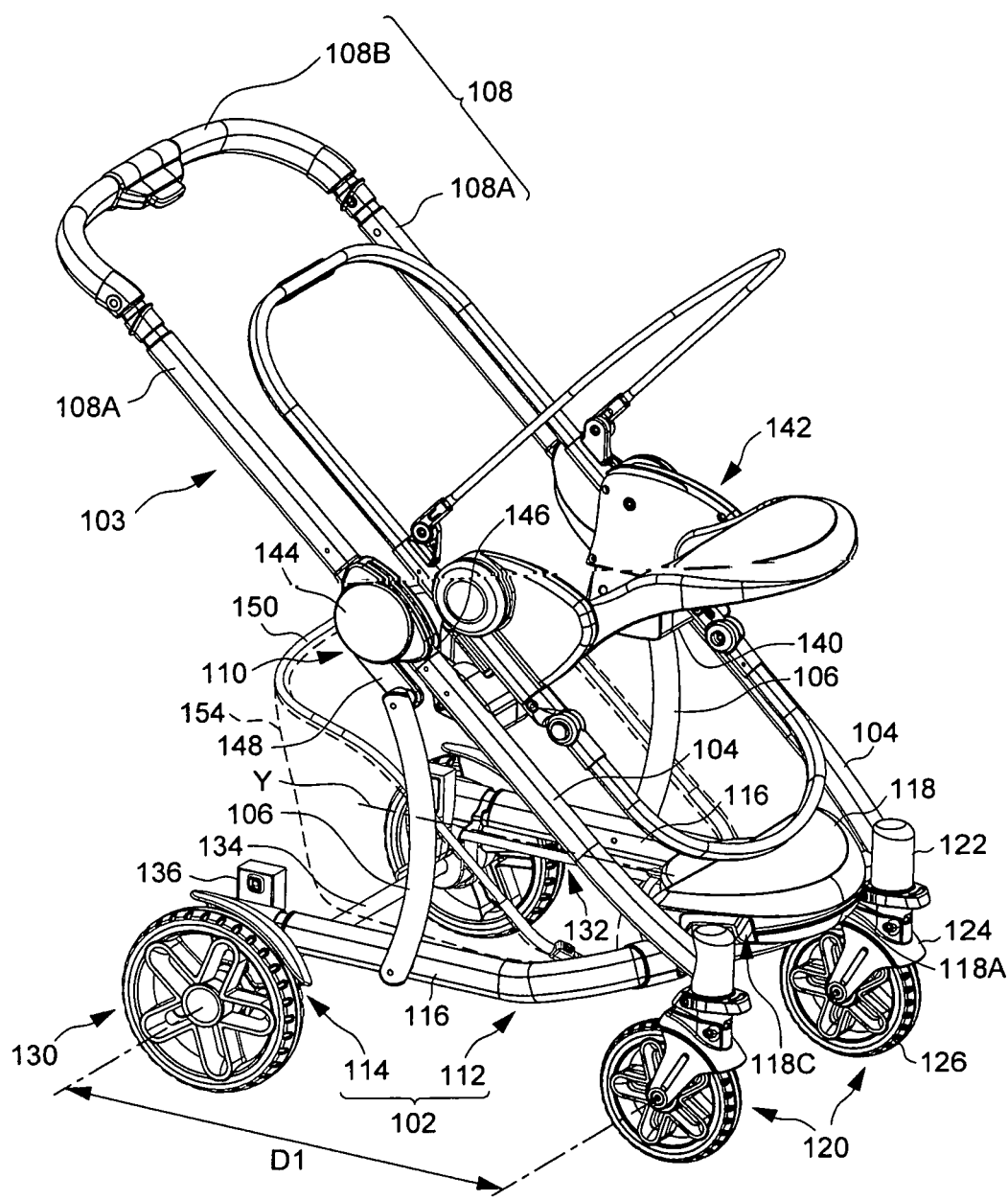
FIG. 1 is a perspective view illustrating an embodiment of a child stroller apparatus having an expandable stroller frame, the child stroller apparatus being shown in a shortened or contracted state.

FIG. 1 is a perspective view illustrating an embodiment of a child stroller apparatus 100 having an expandable stroller frame. The child stroller apparatus 100 can include a base 102, and an upper frame portion 103 coupled to the base 102 with the upper frame portion 103 being comprised of two front or first leg portions 104, two rear or second leg portions 106, a handle frame 108 and two joint structures 110. The base 102 can include two frame portions 112 and 114. The frame portion 112 can be exemplary a front frame portion, and the frame portion 114 can be exemplary a rear frame portion. The two frame portions 112 and 114 are slidably assembled with each other so that the frame portion 114 can slide generally horizontally relative to the frame portion 112 along a lengthwise axis Y extending centrally from a front to a rear of the child stroller apparatus 100.

The frame portion 112 can include two tube portions 116 and a footrest 118. The footrest 118 can be provided as a shell body having a hollow interior, which can be exemplary made of a plastic material. The footrest 118 can be fixedly connected with the two tube portions 116 at a front of the frame portion 112, and the two tube portions 116 can extend at least partially parallel to each other at a left and a right side of the footrest 118. Moreover, the frame portion 112 can be provided with one or more wheel assembly 120. For example, two wheel assemblies 120 can be respectively assembled with the frame portion 112 at the left and right sides of the footrest 118. Each wheel assembly 120 may include a mount base 122, a rotary bracket 124 connected with an underside of the mount base 122 for rotation about a vertical axis, and a wheel 126 pivotally connected the rotary bracket 124. Each wheel assembly 120 can be connected with the frame portion 112 near the footrest 118 via the mount base 122, which may be fixedly or pivotally connected with the frame portion 112.

The frame portion 114 can include two tube portions 128 (better shown in FIG. 2), two wheel assemblies 130 and an inner frame member 132. The two tube portions 128 can extend generally parallel to each other at the left and right sides of the base 102. The two tube portions 128 can be telescopically assembled with the two tube portions 116, so that the frame portion 114 can slide relative to the frame portion 112 along the lengthwise axis Y.

The two wheel assemblies 130 can be respectively attached to the two tube portions 128 near the rear ends thereof. A transversal shaft 134 fixedly connected with the two tube portions 128 of the frame portion 114 can have two ends respectively connected with the two wheel assemblies 130.

Figure 2:
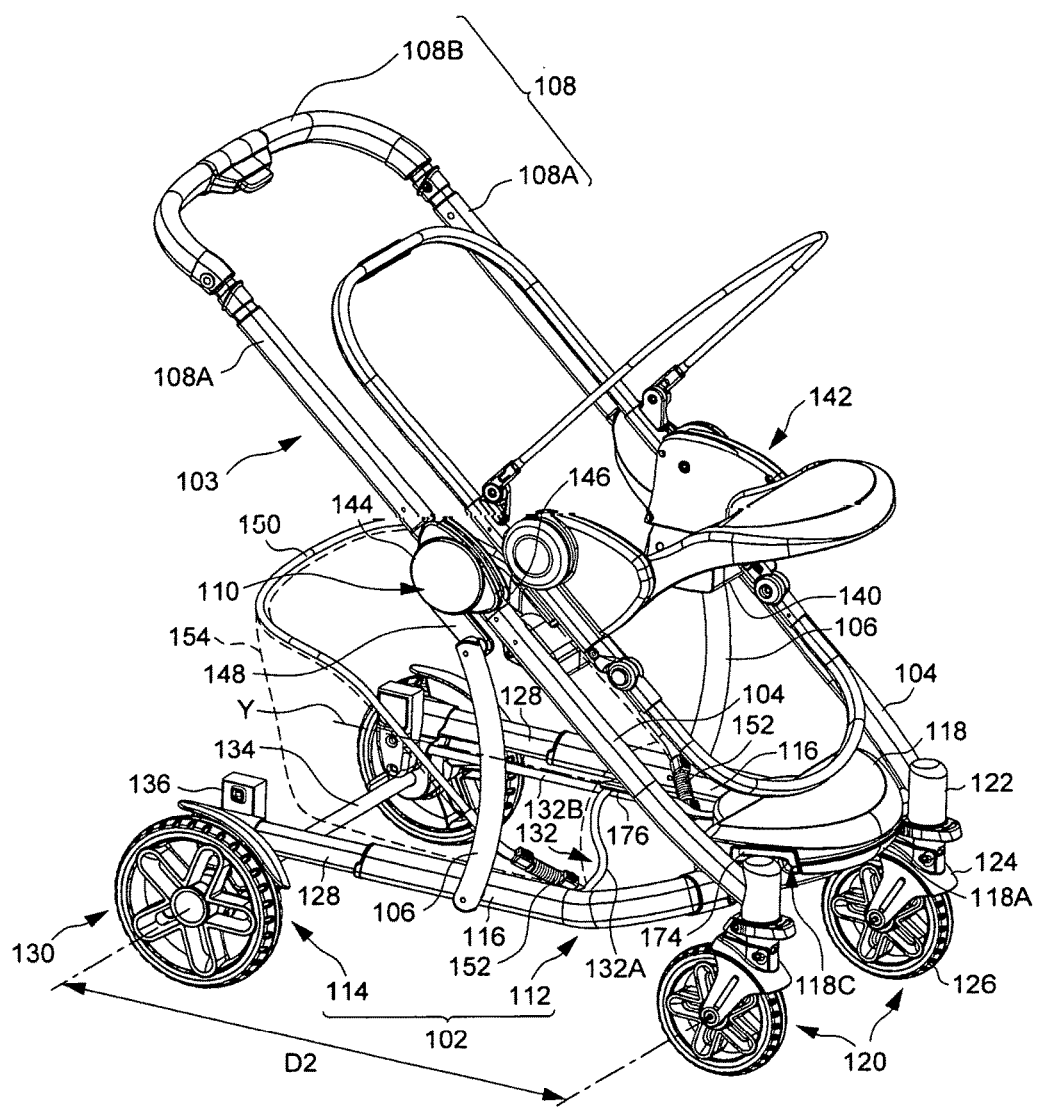
FIG. 2 is a perspective view illustrating the child stroller apparatus of FIG. 1 in an expanded state.

The inner frame member 132 can be made of a rigid material (e.g., rigid tubular structure), and can be fixedly connected with the two tube portions 128. According to an example of construction, the inner frame member 132 can have a transversal segment 132A and two side segments 132B fixedly joined with one another to form a unitary part, which is better shown in FIG. 6. The transversal 132A of the inner frame member 132 extends from a left to a right side of the frame portion 114 across a central region of the base 102. The two side segments 132B of the inner frame member 132 can be respectively attached fixedly to the two tube portions 128 of the frame portion 114, and can extend generally along the lengthwise axis Y. A shape defined by the inner frame member 132 can exemplary include a generally U-shape. As shown in FIGS. 1 and 2, the inner frame member 132 can be placed in an inner region between the two tube portions 128 and overlap with the frame portion 112. Since the inner frame member 132 is fixedly attached to the frame portion 114, they can slide in unison along the lengthwise axis Y relative to the frame portion 112.

Referring to FIGS. 1 and 2, the frame portion 114 can further include two seat mounts 136 configured to detachably engage with a seat 138 (better shown in FIG. 5), which may be a stroller seat or an infant car seat installed in a forward or rearward facing position. The two seat mounts 136 can be respectively assembled with the two tube portions 128 of the frame portion 114, e.g., near the wheel assemblies 130. According to some example of implementation, each seat mount 136 can have a construction allowing adjustment of the seat mount 136 between a deployed position where it projects upward for receiving the installation of the seat 138, and a stowed position where the seat mount 136 lies down generally horizontally to facilitate storage.

Referring to FIGS. 1 and 2, the leg portions 104 and 106 can be respectively disposed symmetrically at a left and a right side of the child stroller apparatus 100. Any of the leg portions 104 and 106 can include, e.g., rigid tubular segments. The two leg portions 104 can be respectively connected pivotally with the frame portion 112 at the left and right sides of the footrest 118. For example, each leg portion 104 can have a lower end pivotally connected with the mount base 122 of one corresponding wheel assembly 120, whereby the leg portions 104 are rotatable relative to the frame portion 112 about a pivot axis extending transversally from a left to a right side.

Each of the leg portions 104 can be respectively assembled with a seat mount 140 configured to detachably engage with a seat 142, which may be a stroller seat or an infant car seat. The two seat mounts 140 can be assembled symmetrically with the two leg portions 104, e.g., near upper ends of the two leg portions 104. According to some example of implementation, each seat mount 140 can further have a construction allowing adjustment of the seat mount 140 between a deployed position where it projects upward for receiving the installation of the seat 142, and a stowed position where the seat mount 140 lies down generally horizontally to facilitate storage.

The two leg portions 106 can be respectively connected pivotally with the frame portion 112 in an intermediate region between the wheel assemblies 120 and the wheel assemblies 130. For example, each leg portion 106 can have a lower end that is pivotally connected with one corresponding tube portion 116 of the frame portion 112 at a position between the wheel assemblies 120 and the wheel assemblies 130 along the lengthwise axis Y. The leg portions 106 are thereby rotatable relative to the frame portion 112 about a pivot axis extending transversally from a left to a right side of the child stroller apparatus 100.

Referring to FIGS. 1 and 2, the handle frame 108 can include two side segments 108A and a transversal segment 108B connected with each other. The two side segments 108A can be disposed symmetrically at the left and right side of the child stroller apparatus 100. At each of the left and right sides, the side segment 108A of the handle frame 108 can be respectively connected pivotally with one leg portion 104 and one leg portion 106 via one joint structure 110. For example, the joint structure 110 can include a coupling member 144 fixedly attached to a lower end of one side segment 108A, and a coupling member 146 that is fixedly attached to an upper end of one leg portion 104 and is pivotally connected with the coupling member 144. Each of the coupling members 144 and 146 can be exemplary made of plastic materials. Moreover, the coupling member 144 may include a linking arm 148 disposed offset from the pivot axis about which the handle frame 108 can rotate relative to the leg portions 104. The linking arm 148 can be pivotally connected with an upper end of one corresponding leg portion 106. With this construction, the handle frame 108 can respectively rotate relative to the leg portions 104 and the leg portions 106 about two different pivot axes for unfolding or collapsing the child stroller apparatus 100.

Referring again to FIGS. 1 and 2, the child stroller apparatus 100 may further include a basket frame portion 150 assembled with the base 102. The basket frame portion 150 can be configured as a support for attaching and stretching a softgoods material, which may exemplary include a fabric material, thereby defining a sidewall of a storage basket 154 (shown with phantom lines in FIG. 1). For example, the basket frame portion 150 can be movably connected with the inner frame member 132 via springs 152 (better shown in FIG. 2). According to one example of construction, the basket frame portion 150 can have a generally U-shape having two ends, and each spring 152 can be respectively connected with one corresponding end of the backrest frame portion 150 and the inner frame member 132. The springs 152 can thereby act as pivot connections allowing rotational displacement of the basket frame portion 150 relative to the base 102.

Figure 5:
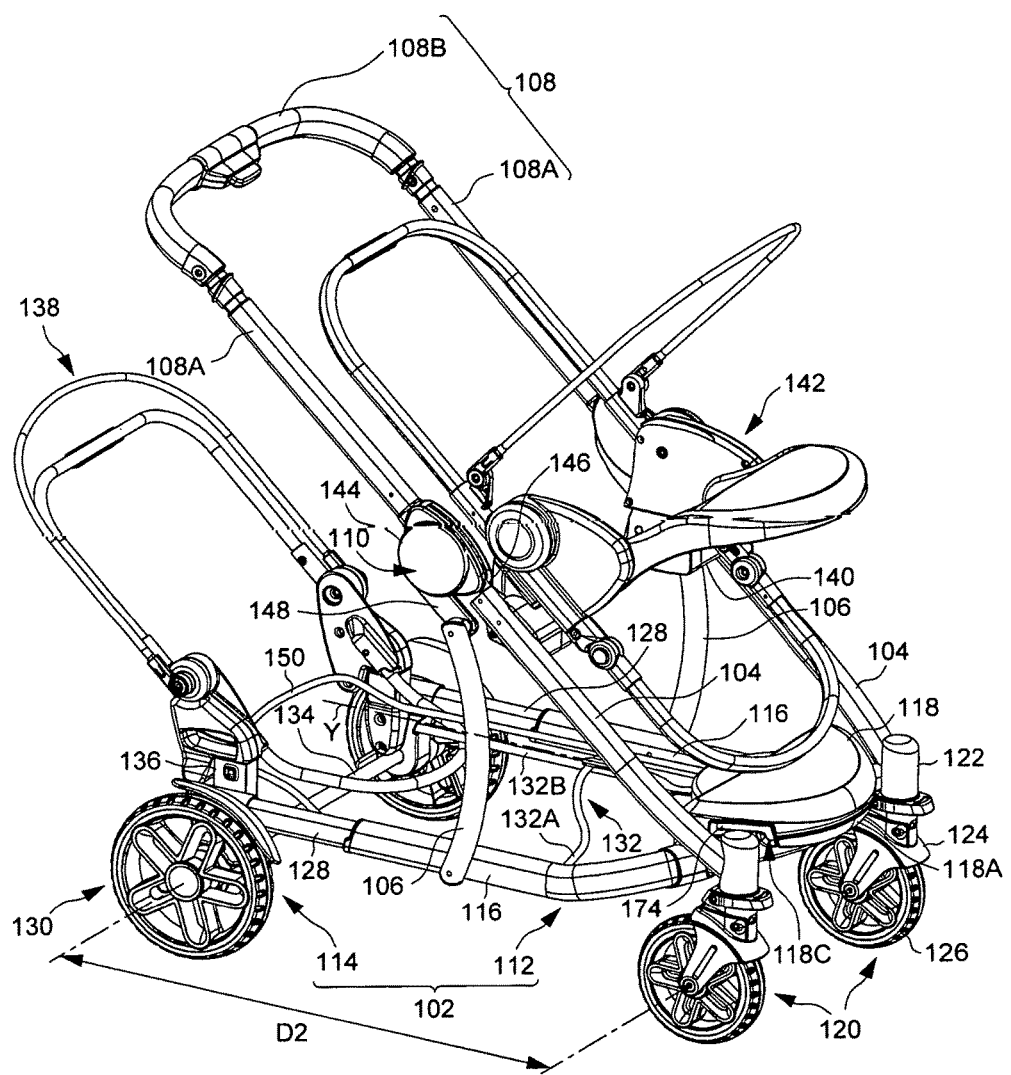
FIG. 5 is a perspective view illustrating the child stroller apparatus in the expanded state with two detachable seats installed thereon.

The springs 152 can bias the basket frame portion 150 to a rise position (as shown in FIGS. 1 and 2) where it projects rearward and upward substantially above the base 102, thereby expanding the softgoods material of the storage basket 154 for use. The storage basket 154 can span across the two frame portions 112 and 114, and the seat mounts 136 may be disposed outside or in an interior of the storage basket 154. Moreover, the basket frame portion 150 can be displaced toward the base 102 to a collapse position (as shown in FIG. 5) for better accessibility to the interior of the storage basket 154. The collapse position of the basket frame portion 150 may further facilitate access to the seat mounts 136 of the frame portion 114 for installation of the seat 138 on the seat mounts 136.

The storage basket 154 may offer a convenient storage function, and can move along with the frame portion 114 relative to the frame portion 112. However, it will be appreciated that the child stroller apparatus 100 is not limited to the aforementioned construction provided with the storage basket 154. In some variant implementation, the basket frame portion 150 may be omitted.

Figure 3:
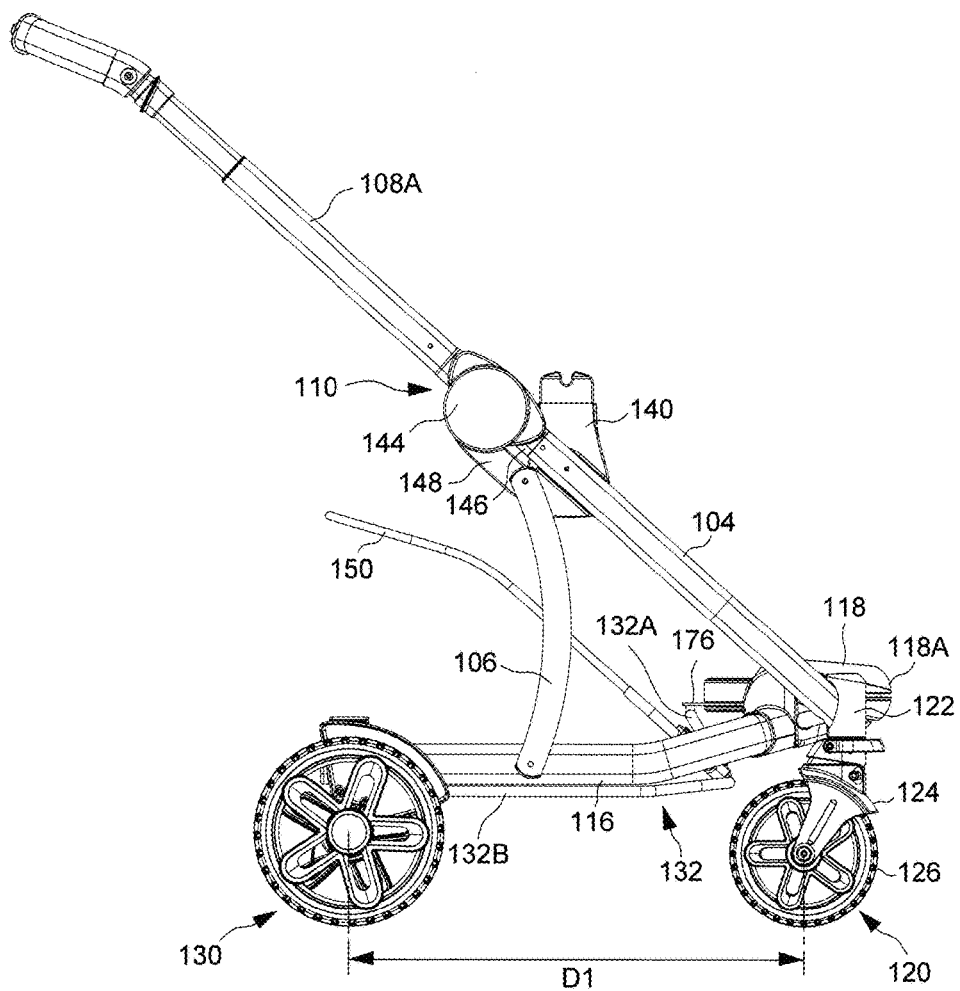
FIG. 3 is a side view illustrating the stroller frame of the child stroller apparatus shown in FIG. 1 with no seats installed thereon, the stroller frame being shown in the shortened state.
Figure 4:
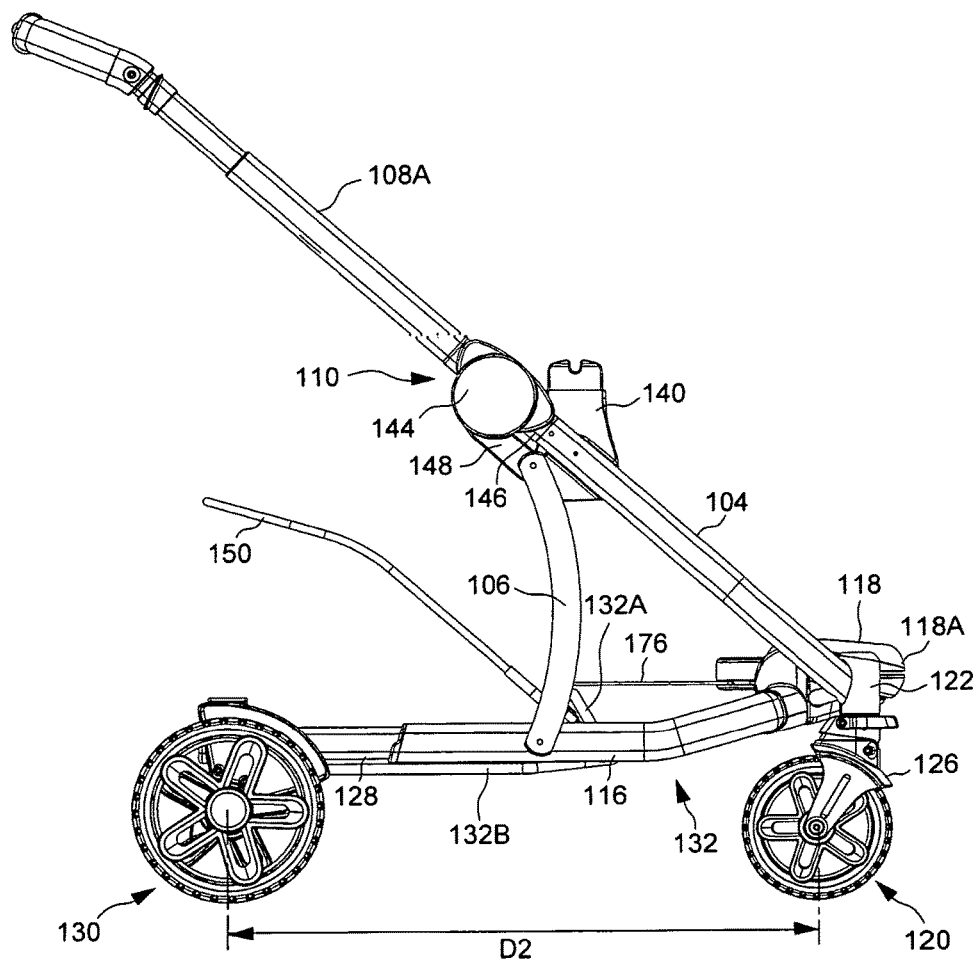
FIG. 4 is a side view illustrating the stroller frame of the child stroller apparatus with no seats installed thereon in the expanded state.

With the aforementioned construction, the frame portion 114 can slide along the lengthwise axis Y relative to the frame portion 112 to increase or reduce a distance between the wheel assemblies 120 and the wheel assemblies 130, according to the needs. For example, when the child stroller apparatus 100 is used for transporting only one child on the seat 142, the frame portions 112 and 114 can be adjusted to set a distance D1 between the wheel assemblies 120 and the wheel assemblies 130 for shortening the base 102 (better shown in FIGS. 1 and 3), thereby disabling the installation of a seat on the seat mounts 136. When the child stroller apparatus 100 is used for transporting two children, the frame portion 114 can slide rearward relative to the frame portion 112 to set a distance D2 between the wheel assemblies 120 and the wheel assemblies 130 (better shown in FIGS. 2, 4 and 5) that is greater than the distance D1, thereby providing more room for the installation of the seat 138 on the seat mounts 136 in addition to the seat 142.

Figure 6:
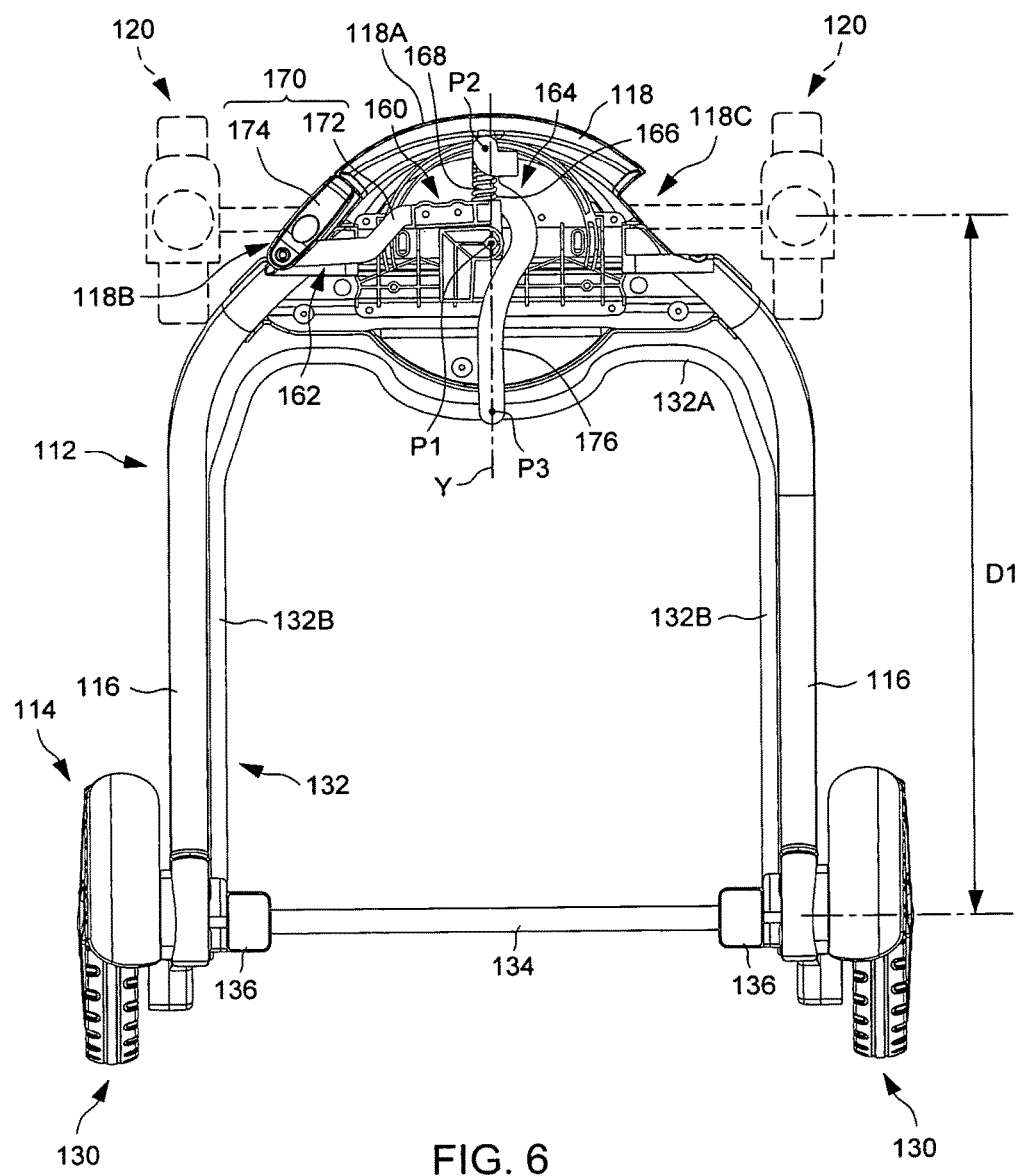
FIG. 6 is a schematic view illustrating a control mechanism operable to expand and shorten the child stroller apparatus, the control mechanism being shown in the shortened state of the child stroller apparatus.
Figure 7:
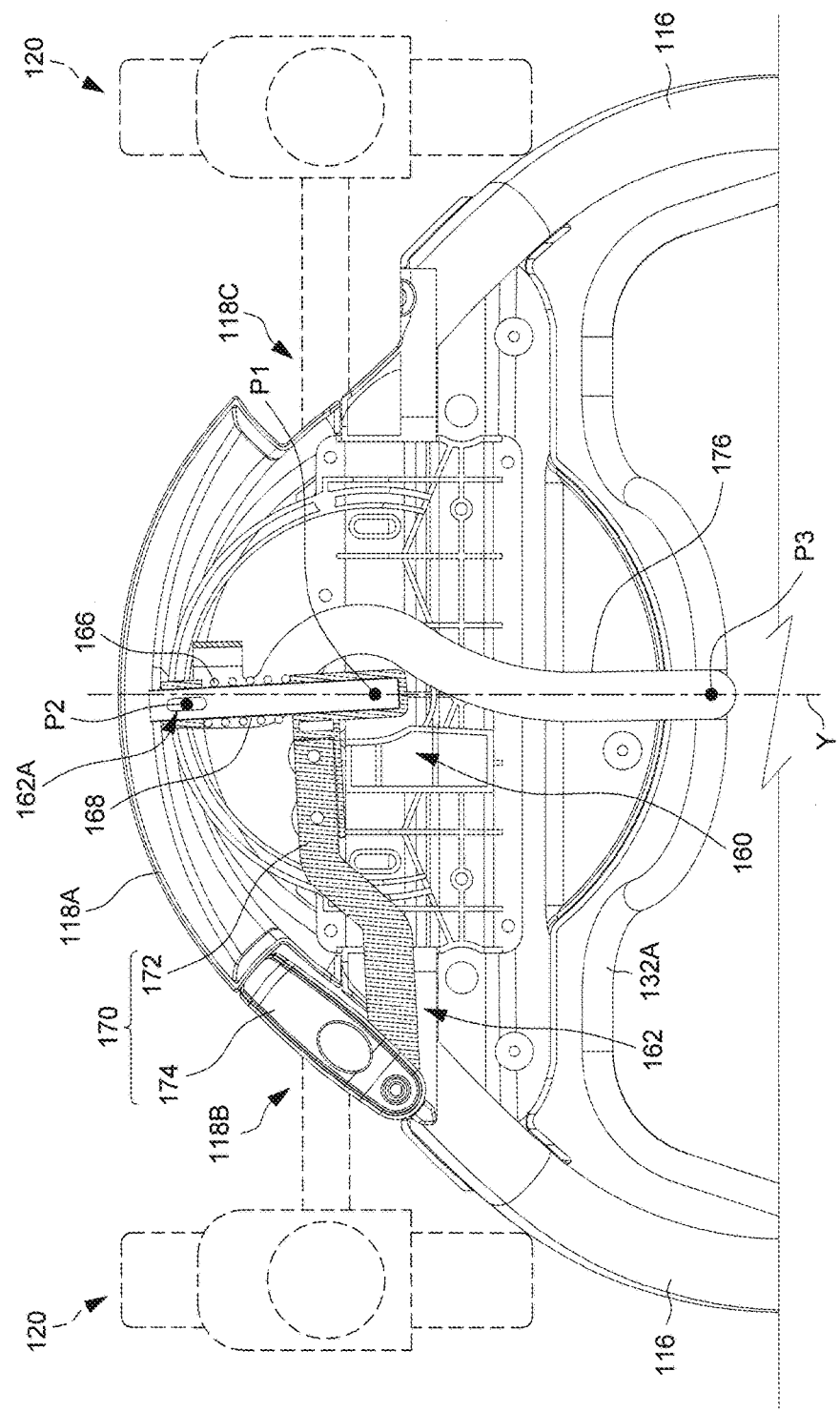
FIG. 7 is an enlarged cross-sectional view of the control mechanism shown in FIG. 6.

Referring to FIGS. 1 and 2, the child stroller apparatus 100 can further include a control mechanism 160 operable to adjust a position of the frame portion 114 relative to the frame portion 112, thereby facilitating expansion or contraction of the base 102. In conjunction with FIGS. 1 and 2, FIG. 6 is a schematic view illustrating a construction of the control mechanism 160, and FIG. 7 is a cross-sectional view of the control mechanism 160. Referring to FIGS. 1, 2, 6 and 7, the control mechanism 160 can be provided on the base 102, and can include an actuator 162, a linkage 164 and a spring 166. The actuator 162 is pivotally connected with the frame portion 112 via a pivot connection P1, and can have a guide slot 162A disposed eccentric from the pivot connection P1. According to one example of construction, the actuator 162 may be disposed adjacent to the footrest 118. For example, the footrest 118 can be made of a plastic material having a hollow interior, and the actuator 162 can be assembled through the interior of the footrest 118. The actuator 162 can include a tubular segment 168 and a handle 170 fixedly connected with each other to form a unitary part operating as a lever. The tubular segment 168 can be pivotally connected with the footrest 118 via the pivot connection P1, and can be provided with the guide slot 162A. According to an example of implementation, the pivot connection P1 may be centered on the lengthwise axis Y.

The handle 170 can project at an angle from the tubular segment 168, so that the tubular segment 168 and the handle 170 form an elbow-like bend. The handle 170 of the actuator 162 may be exposed on a sidewall 118A of the footrest 118 for manual operation. According to an example of construction, the handle 170 may include a rod 172 fixedly connected with the tubular segment 168, and a gripping part 174 pivotally connected with an end of the rod 172 that forms the exposed part of the handle 170. The gripping part 174 may facilitate grasping of the handle 170 for rotating the actuator 162 about the pivot connection P1 relative to the frame portion 112.

The linkage 164 is respectively connected with the actuator 162 and the frame portion 114. According to an example of construction, the linkage 164 can include a bar 176 that is respectively connected pivotally with the actuator 162 and the frame portion 114. The bar 176 can be pivotally connected with the actuator 162 via a pivot connection P2 that is guided for sliding displacement along the guide slot 162A. The pivot connection P2 can include, for example, a shaft portion assembled through the guide slot 162A. Moreover, the bar 176 can be pivotally connected with the frame portion 114 via a pivot connection P3. For example, the pivot connection P3 can connect an end of the bar 176 with the inner frame member 132. The pivot connection P3 may be centered on the lengthwise axis Y, and connect with the transversal segment 132A of the inner frame member 132 in a central region of the child stroller apparatus 100.

Referring again to FIGS. 6 and 7, the spring 166 is operatively connected with the actuator 162 and the linkage 164. According to an example of construction, the spring 166 can be assembled around the tubular segment 168, and can have two opposite ends respectively connected with the actuator 162 and the pivot connection P2. The spring 166 may be a compressive spring.

In the control mechanism 160, the actuator 162 and the linkage 164 are movable generally horizontally. Moreover, the actuator 162 is operable to drive the frame portion 114 in sliding movement relative to the frame portion 112 for increasing or reducing a distance between the wheel assemblies 120 and 130. In particular, the handle 170 is operable to cause the actuator 162 to rotate about the pivot connection P1 relative to the frame portion 112, which in turn urges the linkage 164 to move for pulling or pushing the frame portion 114 to slide along the lengthwise axis Y relative to the frame portion 112.

Figure 8:
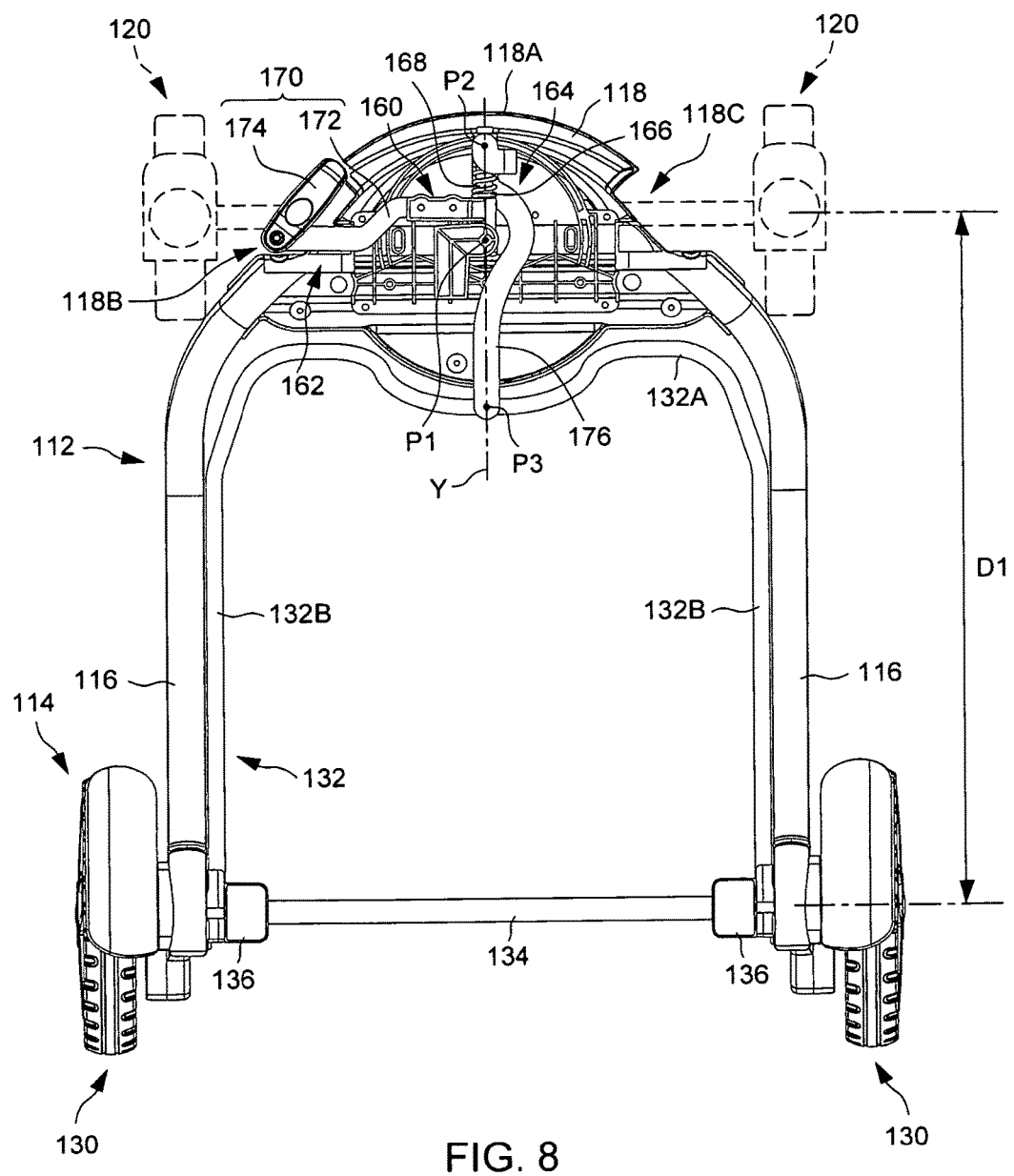
FIG. 8 is a schematic view illustrating the control mechanism in a centered position for initiating the adjustment of the child stroller.
Figure 9:
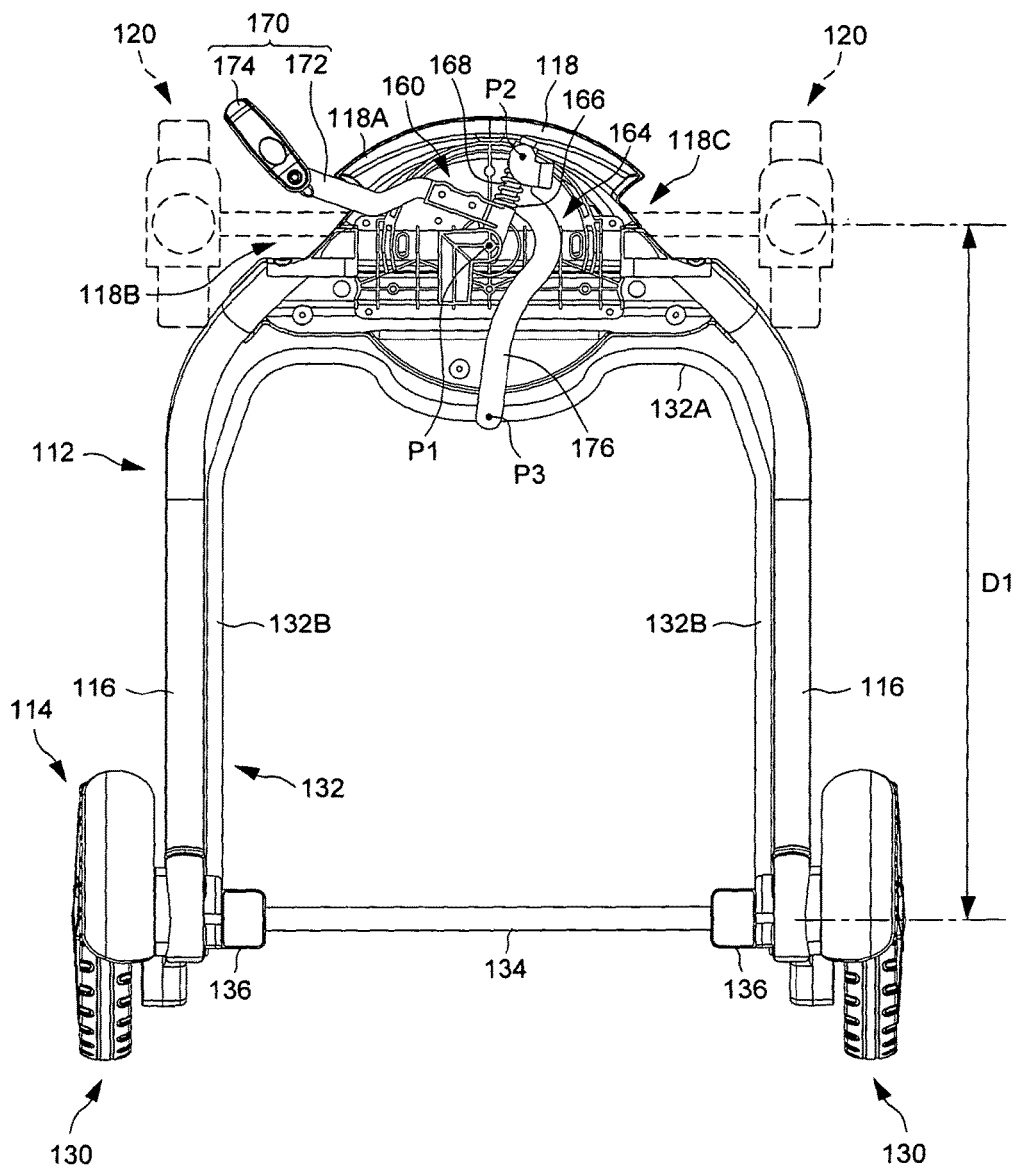
FIG. 9 is a schematic view illustrating the control mechanism in an intermediate state during adjustment of the child stroller apparatus between the shortened and expanded state.
Figure 10:
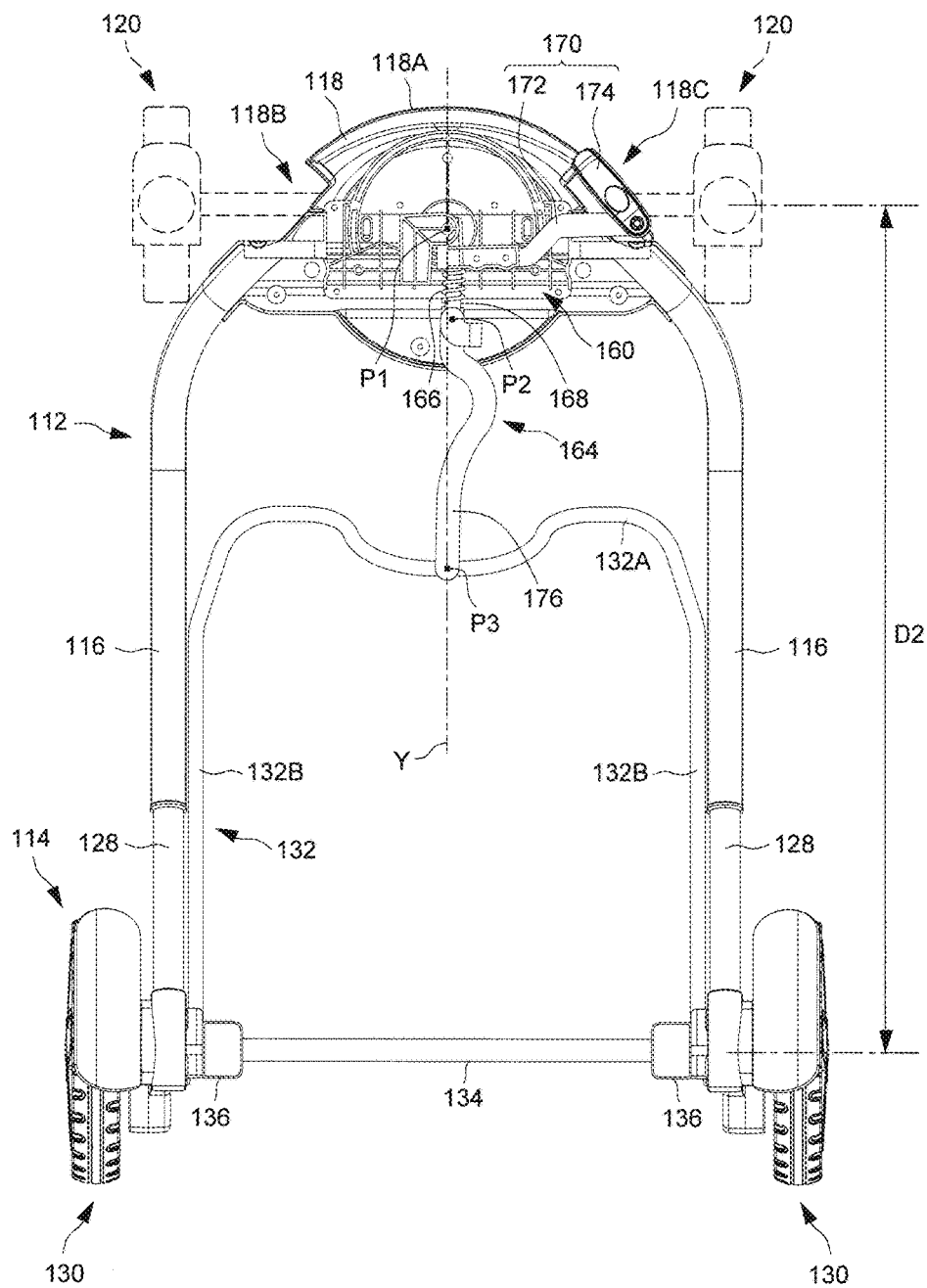
FIG. 10 is a schematic view illustrating the control mechanism in an expanded state of the child stroller apparatus.

In conjunction with FIGS. 1-7, reference is further made to FIGS. 8-10 for describing exemplary operation of the control mechanism 160. In FIG. 6, the actuator 162 is shown in a first position corresponding to a shortened or contracted configuration of the child stroller apparatus 100 where the wheel assemblies 120 and 130 are spaced apart from each other by a distance D1. In this first position, the gripping part 174 of the actuator 162 can be partially exposed through an opening 118B formed on the sidewall 118A of the footrest 118. In this shortened configuration, the three pivot connections P1, P2 and P3 can define three distinct apexes of a triangle. Moreover, the spring 166 can apply a biasing force for keeping the apex of the pivot connection P2 offset from a line joining the respective apexes of the two other pivot connections P1 and P3, which can help to maintain the triangular geometry formed by the three pivot connections P1, P2 and P3 and keep the child stroller apparatus 100 in the shortened configuration. This shortened configuration can correspond to the shortened state shown in FIG. 1 disabling the installation of a seat on the seat mounts 136 of the frame portion 114.

When a caregiver wants to expand the child stroller apparatus 100, the caregiver can grasp the gripping part 174 of the handle 170, and displace it along the sidewall 118A of the footrest 118. As a result, the actuator 162 (including the tubular segment 168 and the handle 170) can rotate about the pivot connection P1 relative to the frame portion 112 from the first position shown in FIG. 6 to a second position shown in FIG. 10. During this rotation, the actuator 162 can travel past an intermediate center position shown in FIG. 8 where the spring 166 is loaded and the three pivot connections P1, P2 and P3 are centered on a same line substantially coaxial to an axis of the spring 166 (which may correspond to the lengthwise axis Y). As the actuator 162 travels toward the second position shown in FIG. 10, the two pivot connections P2 and P3 respectively move relative to the frame portion 112, and the linkage 164 is displaced so as to urge the frame portion 114 to slide rearward relative to the frame portion 112 for expanding the base 102.

Once the actuator 162 reaches the second position shown in FIG. 10 with the gripping part 174 positioned in another opening 118C formed on the sidewall 118A of the footrest 118, the child stroller apparatus 100 is in an expanded configuration where the wheel assemblies 120 and 130 are spaced apart from each other by a distance D2 greater than the distance D1, and the three pivot connections P1, P2 and P3 can define three distinct apexes of a triangle. Likewise, the spring 166 can apply a biasing force for keeping the apex of the pivot connection P2 offset from a line joining the respective apexes of the two other pivot connections P1 and P3, which can help to maintain the triangular geometry formed by the three pivot connections P1, P2 and P3 and keep the child stroller apparatus 100 in the expanded configuration. This expanded configuration can correspond to the state shown in FIGS. 2, 4 and 5 allowing the installation of the seat 138 on the seat mounts 136 of the frame portion 114, in addition to the seat 142 installed on the seat mounts 140.

For setting the shortened configuration, the seat 138 is first removed, and the actuator 162 then can be rotated reversely from the second position shown in FIG. 10 to the first position shown in FIG. 6, which can displace the linkage 164 and urge the frame portion 114 to slide forward relative to the frame portion 112 for shortening the base 102.

Figure 11:
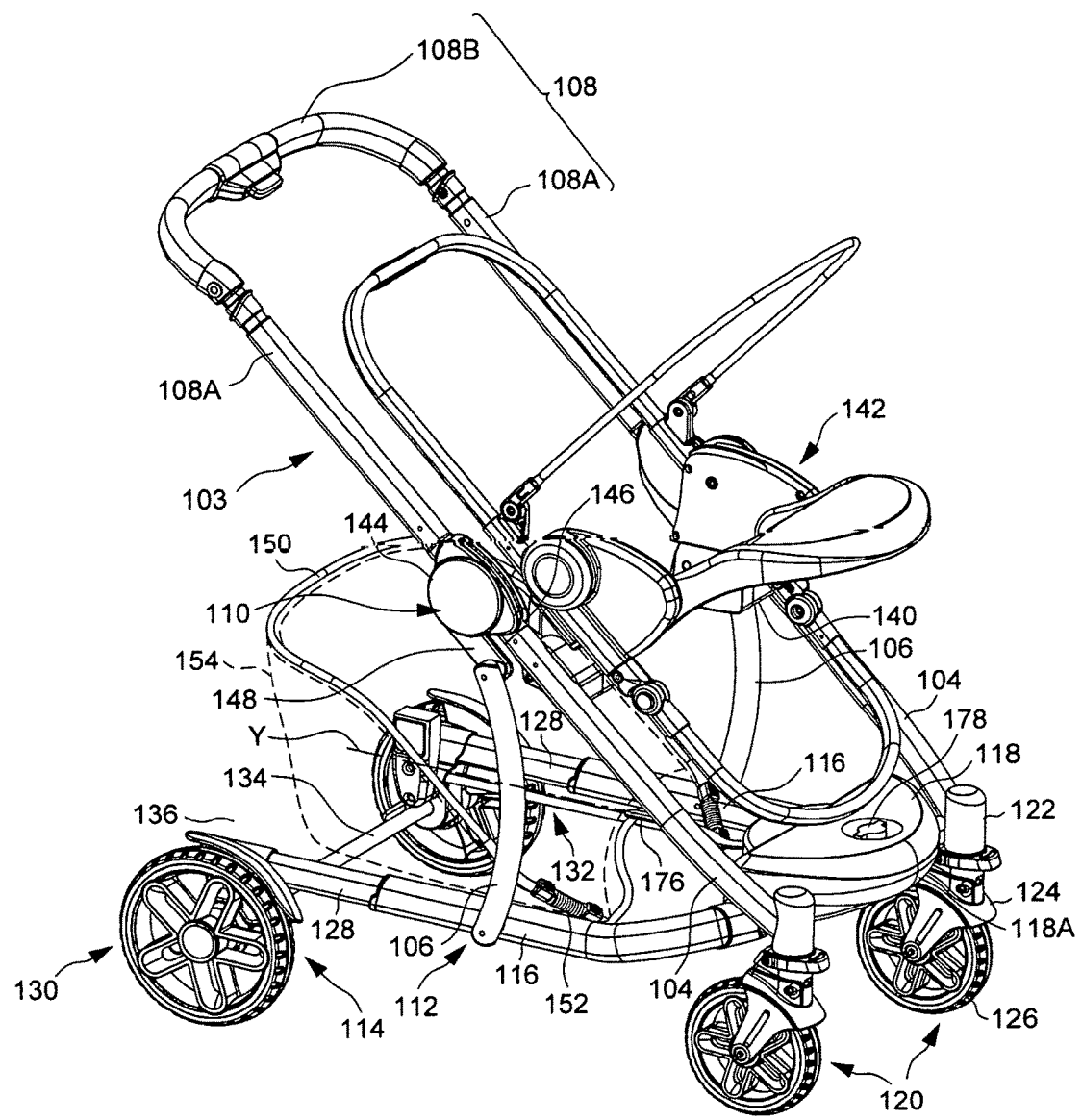
FIG. 11 is a perspective view illustrating a variant construction of an actuator of the control mechanism using a rotary knob.

In the aforementioned construction, the handle 170 of the actuator 162 is operated for converting the child stroller apparatus 100 between the shortened and expanded configuration. It will be appreciated, however, that other operating interfaces may be applicable. FIG. 11 is a schematic view illustrating a variant construction in which the actuator 162 may include a rotary knob 178 that substitutes for the handle 170 and gripping part 174 described previously. The rotary knob 178 can be exposed on an upper surface 118D of the footrest 118, and can be fixedly connected with the tubular segment 168 of the actuator 162 described previously. A caregiver can rotate the rotary knob 178 (e.g., about the pivot connection P1 shown in FIG. 6) to cause rotation of the actuator 162 relative to the frame portion 112 for converting the child stroller apparatus 100 between the shortened and expanded configuration, like previously described.

Figure 12:
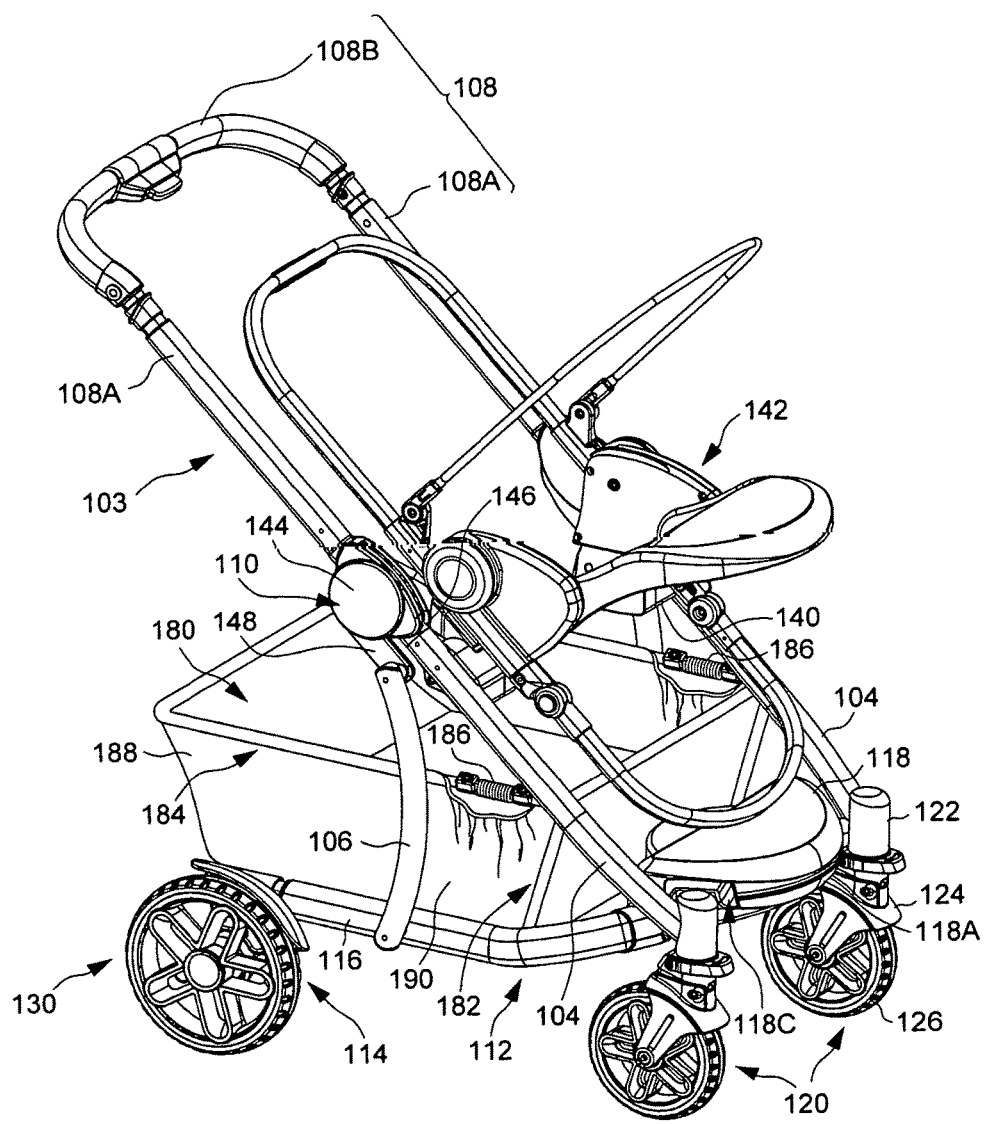
FIG. 12 is a perspective view illustrating a child stroller apparatus having a storage basket expandable during use, the storage basket being shown in a shortened or contracted state.
Figure 13:
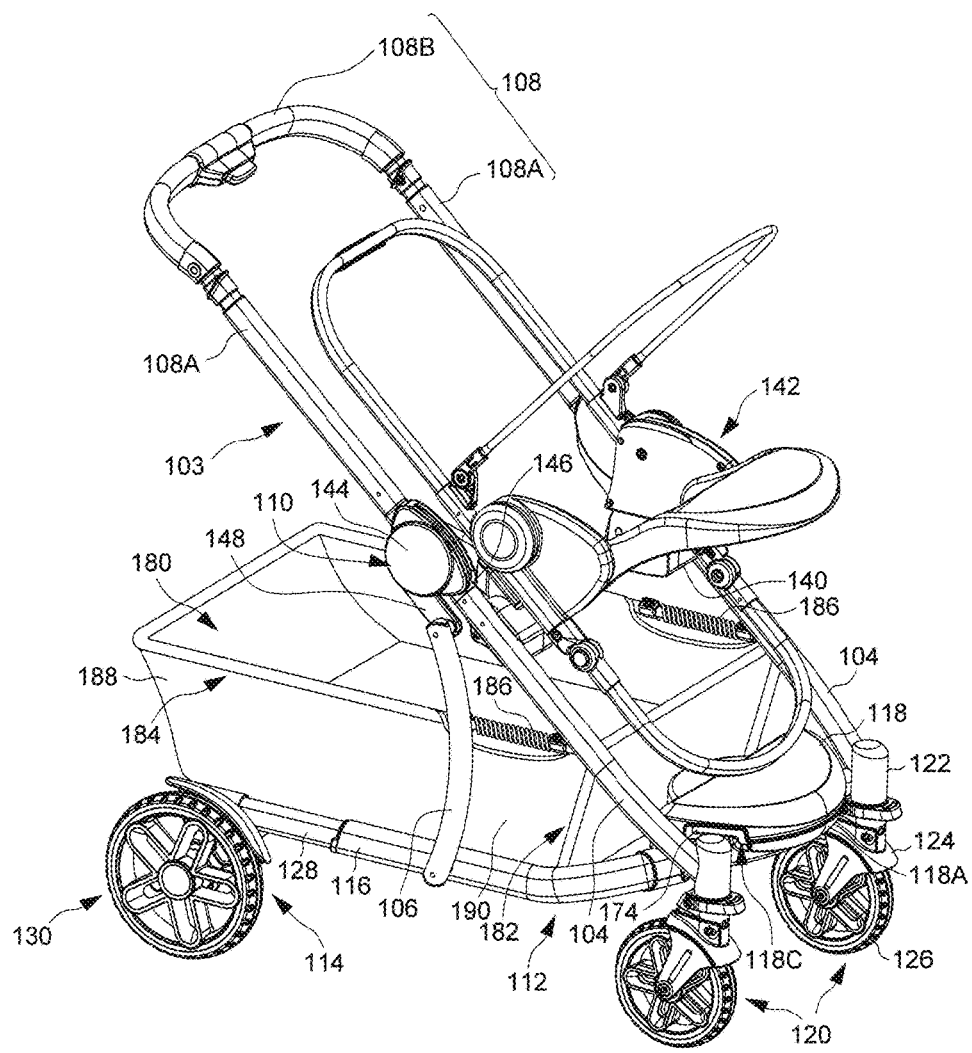
FIG. 13 is a perspective view illustrating the child stroller apparatus of FIG. 12 with the storage basket in an expanded state during use.

FIGS. 12 and 13 are schematic views illustrating a variant construction of the child stroller apparatus 100 provided with an expandable storage basket 180 that can substitute for the storage basket 154 described previously. Like previously described, the child stroller apparatus 100 shown in FIGS. 12 and 13 may have a base 102 comprised of the frame portions 112 and 114 slidable relative to each other for shortening or expanding the base 102. A difference lies in the construction of the expandable storage basket 180, which can include two basket frame portions 182 and 184, two elastic members 186 and a softgoods material 188. The basket frame portion 182 can exemplary include a rigid panel and/or rods disposed at one end of the storage basket 180. The basket frame portion 184 can exemplary include elongated rod segments for defining an upper rim of the storage basket 180. The basket frame portions 182 and 184 can be respectively attached to the frame portions 112 and 114, so that the basket frame portion 184 and the frame portion 114 can move in unison relative to the basket frame portion 182 and the frame portion 112. The two elastic members 186 can be springs, and can be respectively disposed at a left and a right side of the storage basket 180.

Each elastic member 186 can have two ends respectively anchored with the basket frame portions 182 and 184. The softgoods material 188 can be attached to the basket frame portion 184 for defining at least partially an enclosure of the storage basket 180. The spring force applied by the elastic members 186 can assist in holding the basket frame portion 182 in position. Moreover, two flexible panels 190 may further be respectively disposed at the left and right sides of the storage basket 180, each flexible panel 190 respectively connecting with the basket frame portions 182 and 184. The flexible panels 190 can be made of a softgoods material, and can respectively cover the two side regions of the storage basket 180 where the elastic members 186 are assembled.

As shown in FIGS. 12 and 13, the storage basket 180 can span across the two frame portions 112 and 114 of the base 102. A sliding displacement of the frame portion 114 relative to the frame portion 112 for increasing a distance between the wheel assemblies 120 and the wheel assemblies 130 (i.e., for expanding the base 102) can move the basket frame portion 184 away from the basket frame portion 182, which expands the storage basket 180 and stretches the elastic members 186, as schematically shown in FIG. 13. Conversely, a sliding displacement of the frame portion 114 relative to the frame portion 112 for reducing a distance between the wheel assemblies 120 and the wheel assemblies 130 (i.e., for shortening the base 102) can move the basket frame portion 184 toward the basket frame portion 182, which reduces the storage basket 180 and causes contraction of the elastic members 186, as schematically shown in FIG. 12. When no seat is installed on the seat mounts 136 of the frame portion 114, the child stroller apparatus 100 is thus adjustable to expand the storage basket 180 so that it can offer a greater volume for storage.

It will be appreciated that the expandable storage basket 180 may be implemented separately from the control mechanism 160 described previously. For example, some child stroller apparatus may implement the expandable storage basket 180 without the control mechanism 160, some child stroller apparatus may implement the control mechanism 160 without the expandable storage basket 180, and some other child stroller apparatus may incorporate both the control mechanism 160 and the expandable storage basket 180.

Figure 14:
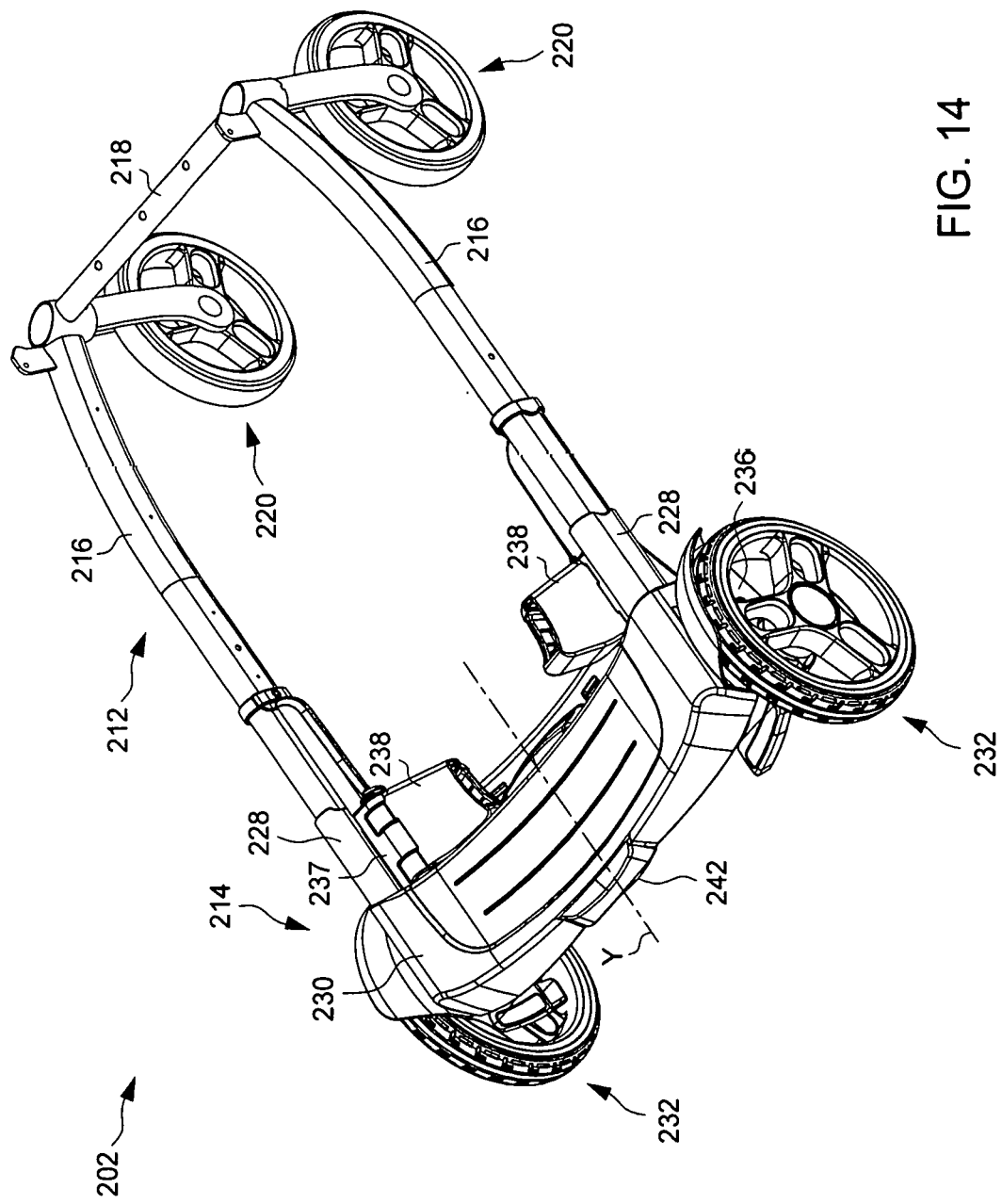
FIG. 14 is a perspective view illustrating an expandable base of a child stroller apparatus provided with another construction of a control mechanism operable to expand and shorten the child stroller apparatus during use.

FIGS. 14-18 are schematic views illustrating an expandable base 202 provided with another construction of a control mechanism 210, which may substitute for the base 102 in the child stroller apparatus 100 illustrated in FIG. 1. For clarity, the upper frame portion of the child stroller apparatus is not represented in FIG. 14. Referring to FIG. 14, the base 202 can have an expandable structure including two frame portions 212 and 214 slidably assembled with each other, the frame portion 212 being exemplary a front frame portion, and the frame portion 214 being exemplary a rear frame portion.

The frame portion 212 can include two tube portions 216 and a transversal segment 218. The transversal segment 218 can be fixedly connected with the two tube portions 216 at a front of the frame portion 212, and the two tube portions 216 can extend at least partially parallel to each other at a left and a right side of the base 202. Moreover, the frame portion 212 can be provided with two wheel assemblies 220. For example, two wheel assemblies 220 can be respectively assembled with the frame portion 212 at the left and right sides of the transversal segment 218.

The frame portion 214 can include two tube portions 228, a stand platform 230 and two wheel assemblies 232. The stand platform 230 can be made of a rigid material, and can provide support for a child standing thereon. The two tube portions 228 can extend generally parallel to each other at the left and right sides of the base 202, and can be fixedly attached to the stand platform 230. The two wheel assemblies 232 may be respectively assembled with the frame portion 214 adjacent to a left and a right side of the stand platform 230. For example, each tube portion 228 can be fixedly attached to a wheel mount 236 projecting downward, and each wheel assembly 232 can be respectively connected with the corresponding wheel mount 236. The two tube portions 228 can be slidably assembled with the two tube portions 216, so that the frame portion 214 (including the tube portions 228, the stand platform 230 and the wheel assemblies 232) can slide generally horizontally along the lengthwise axis Y relative to the frame portion 212 for expanding or contracting the base 202. According to an example of implementation, a sliding connection between the frame portions 212 and 214 can be accomplished by telescopically assembling the tube portions 216 and 228, e.g., by slidably assembling each tube portion 216 through an interior of the corresponding tube portion 228.

Referring again to FIG. 14, the frame portion 212 can further include two seat mounts 238 configured to detachably engage with a seat, which may be a stroller seat or an infant car seat installed in a forward or rearward facing position. The two seat mounts 238 can be respectively attached to the two tube portions 216 at the left and right sides of the frame portion 212 adjacent to the frame portion 214, e.g., close to the stand platform 230. According to some example of implementation, each seat mount 238 can be attached to the corresponding tube portion 216 of the frame portion 212 via a bracket 237, which can be slidably disposed through an elongate slot 235 (better shown in FIG. 17) provided in the corresponding tube portion 228 of the frame portion 214. Moreover, each seat mount 238 can have a construction allowing movement of the seat mount 238 relative to the bracket 237 between a deployed configuration where it projects upward above the stand platform 230 for receiving the installation of a detachable seat, and a stowed configuration where the seat mount 238 lies down generally horizontally to facilitate storage. As the frame portion 214 slides along the lengthwise axis Y relative to the frame portion 212, the seat mounts 238 in the horizontally stowed configuration can be moved relative to the frame portion 214 to an underside of the stand platform 230 or to a forward position relative to the stand platform 230 exposed for use. In particular, the seat mounts 238 may be positioned at the underside of the stand platform 230 when the frame portions 212 and 214 are in a contracted state (i.e., corresponding to a distance D1 between the wheel assemblies 220 and 232), whereby the stand platform 230 can cover and provide protection for the unused seat mounts 238. When the frame portions 212 and 214 are in an expanded state (i.e., corresponding to a distance D2 between the wheel assemblies 220 and 232 that is greater than the distance D1), the seat mounts 238 can be positioned in front of the stand platform 230 and can be switched to the deployed configuration for installation of a seat thereon.

Figure 20:
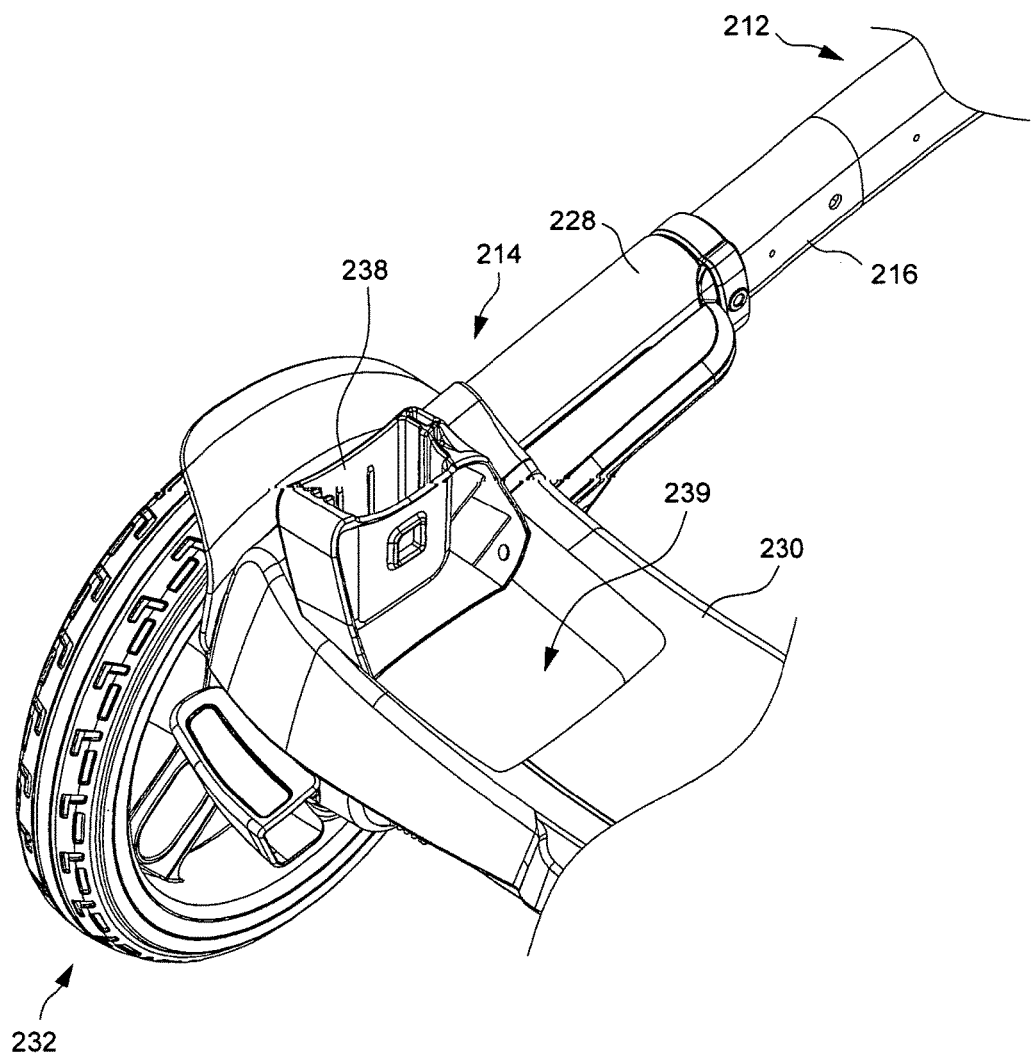
FIG. 20 is a schematic view illustrating an example of possible placement of a seat mount adjacent to a stand platform in the expandable base.

It will be appreciated that the seat mounts 238 are not limited to the aforementioned placement. For example, FIG. 20 is a schematic view illustrating another possible placement wherein the seat mount 238 is attached to the stand platform 210 at a side thereof and can be at least partially received in a recess 239 provided in the stand platform 230 in the stowed position. In the example shown in FIG. 20, the seat mount 238 thus is movable along with the stand platform 230 and the frame portion 214 relative to the frame portion 212.

Figure 15:
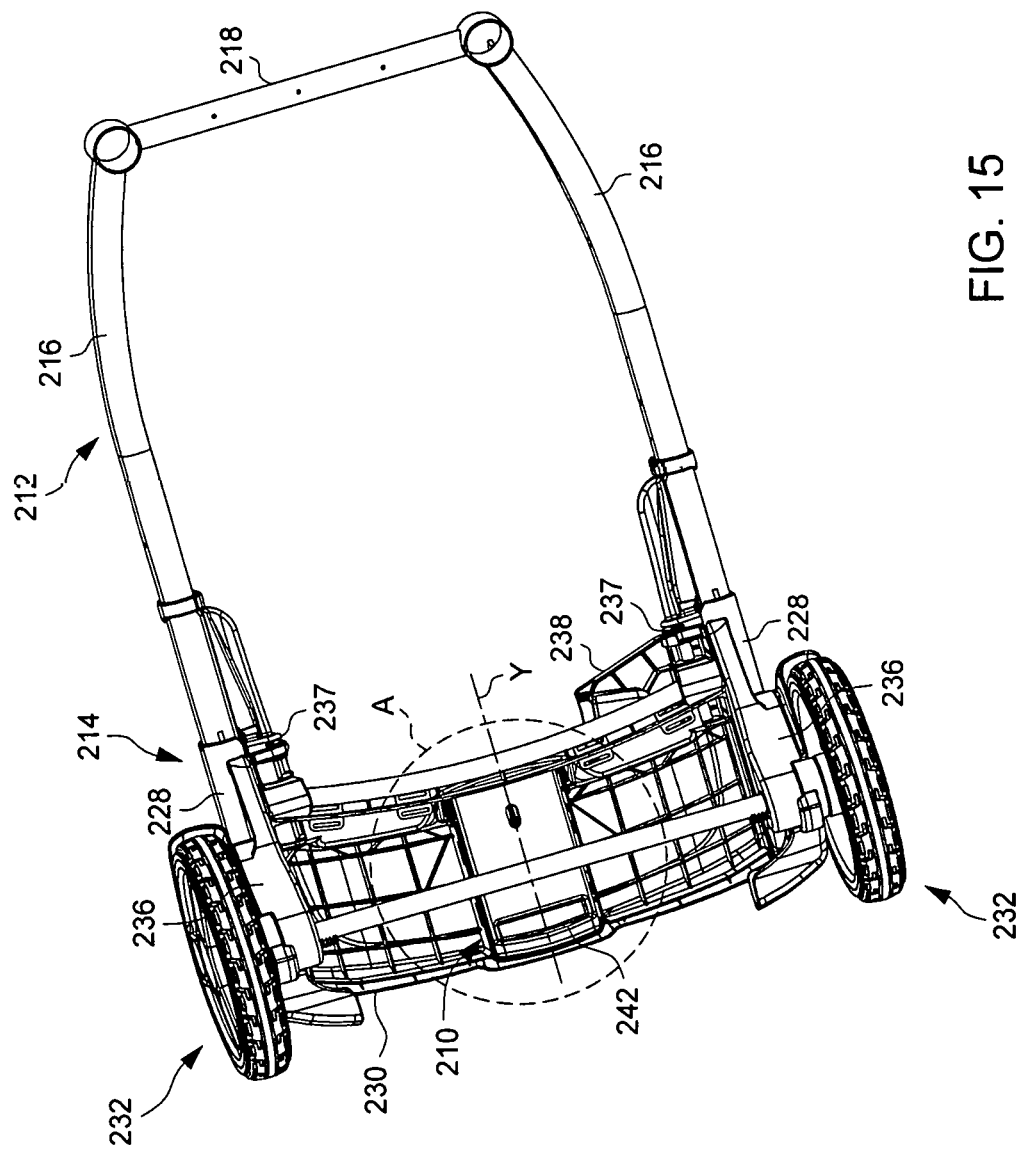
FIG. 15 is a bottom perspective view of the base shown in FIG. 14.
Figure 16:
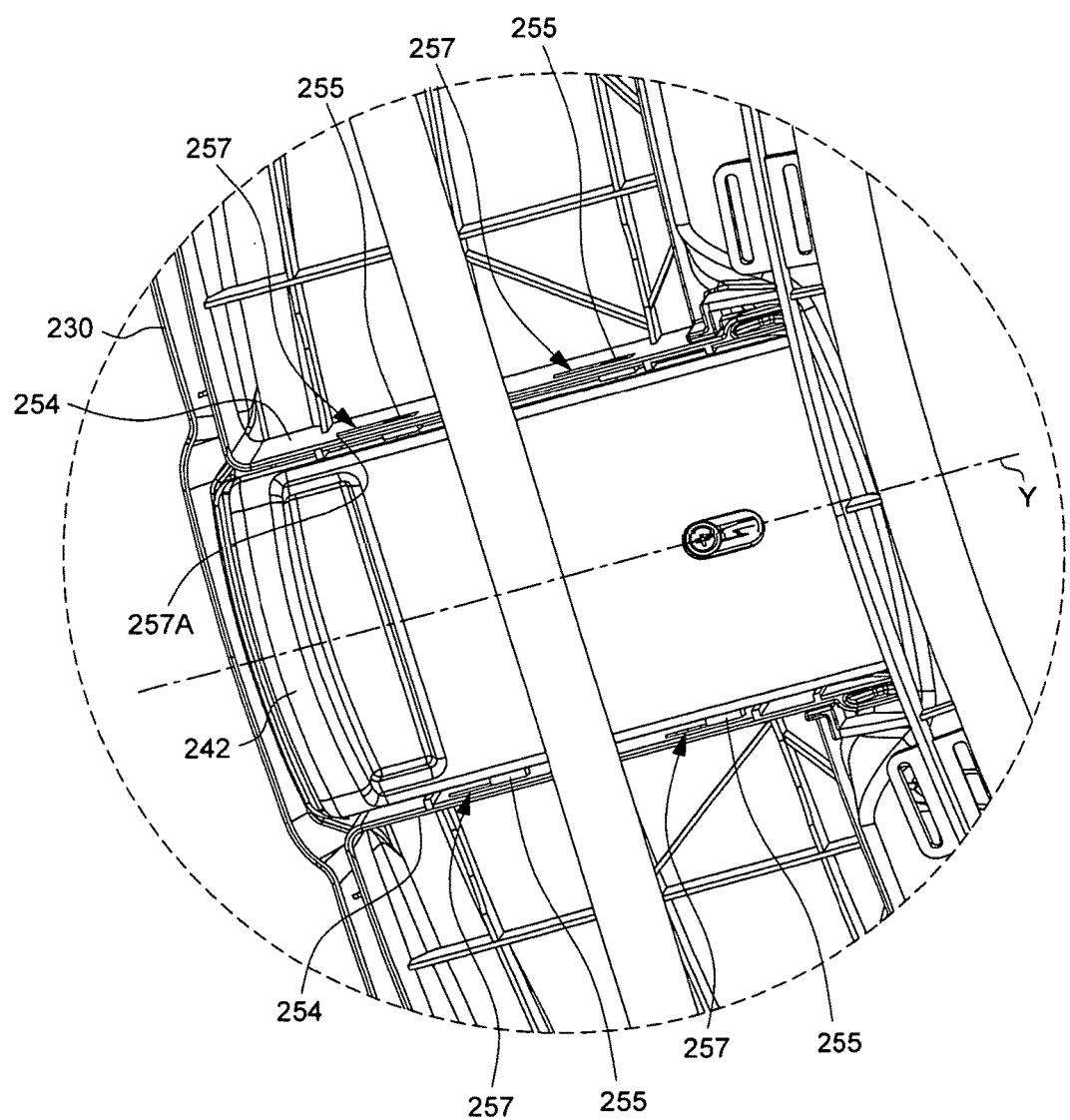
FIG. 16 is an enlarged view of portion A shown in FIG. 15.
Figure 17:
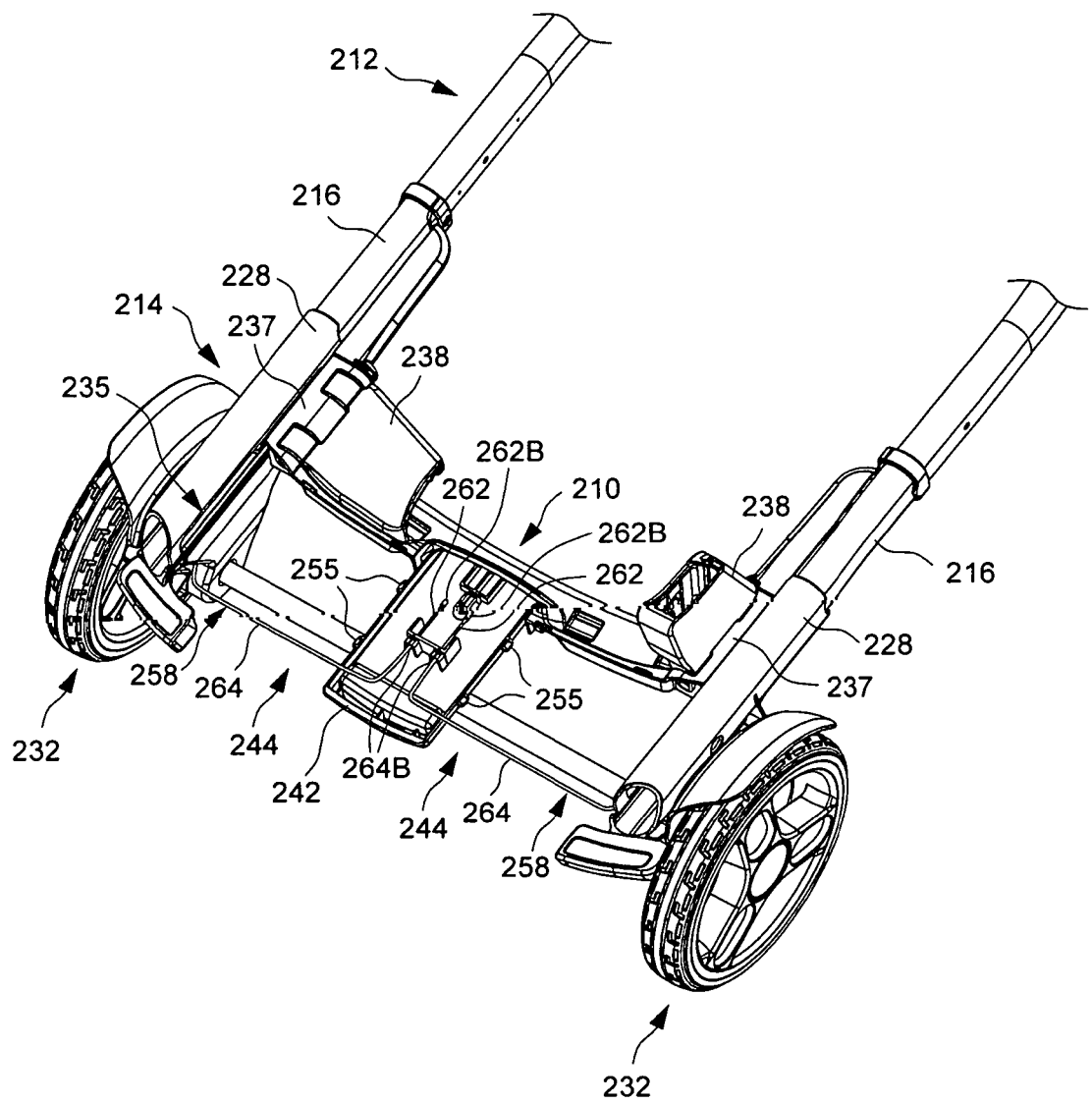
FIG. 17 is a perspective view illustrating a portion of the control mechanism provided on the base shown in FIG. 14.
Figure 18:
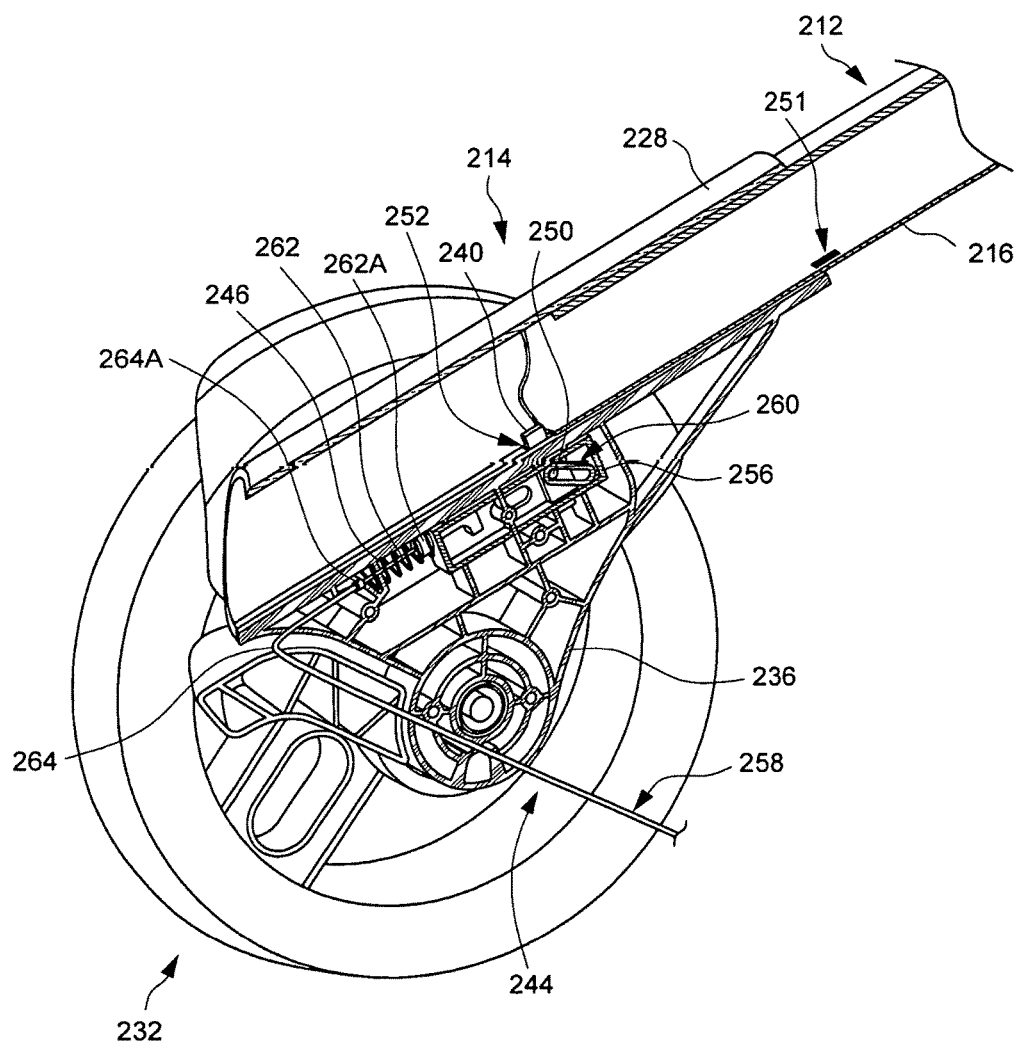
FIG. 18 is a cross-sectional view illustrating another portion of the control mechanism provided on the base shown in FIG. 14.

In conjunction with FIG. 14, FIGS. 15-18 are schematic views illustrating the construction of the control mechanism 210 assembled with the frame portion 214. More specifically, FIG. 15 is a bottom perspective view of the base 202, FIG. 16 is an enlarged view of portion A shown in FIG. 15, FIG. 17 is a schematic view illustrating a portion of the control mechanism 210, and FIG. 18 is a cross-sectional view illustrating another portion of the control mechanism 210. For clarity, the wheel assemblies 220 of the frame portion 212 are omitted in FIG. 15, and the stand platform 230 is not represented in FIG. 17. Referring to FIGS. 14-18, the control mechanism 210 can include two latches 240 (better shown in FIG. 18), an actuator 242, two linking assemblies 244 and two springs 246. The two latches 240, linking assemblies 244 and springs 246 can be similarly assembled with the frame portion 214 in a symmetric manner at the left and right sides thereof. Accordingly, FIG. 18 only illustrates the assembly at one side of the frame portion 214, the other one being identical. More specifically, the two latches 240 can be connected slidably with the frame portion 214 respectively adjacent to the two tube portions 228, and can respectively have protruding pins 250. For example, each latch 240 can be slidably assembled with one corresponding wheel mount 236, and can slide generally vertically through a hole 252 provided on the tube portion 228 to engage with or disengage from the tube portion 216 in the interior of the tube portion 228. Each latch 240 can thereby slide relative to the frame portion 214 for engaging with the tube portion 216 so as to lock the frame portion 214 in position relative to the frame portion 212, and can disengage from the tube portion 216 for sliding movement of the frame portion 214 relative to the frame portion 212. According to an implementation, the latch 240 may exemplary engage with an opening 251 provided on the tube portion 216 for locking the frame portions 212 and 214 in the contracted state (i.e., corresponding to a distance D1 between the wheel assemblies 220 and 232), and with an end edge of the tube portion 216 for locking the frame portions 212 and 214 in the expanded state (i.e., corresponding to a distance D2 between the wheel assemblies 220 and 232 that is greater than the distance D1).

Referring to FIGS. 14-18, the actuator 242 is assembled with the frame portion 214 adjacent to the stand platform 230, and is respectively connected operatively with the two latches 240 via the two linking assemblies 244. According to an implementation, the actuator 242 may be slidably connected with the stand platform 230 adjacent to a central region thereof for sliding movement along the lengthwise axis Y relative to the frame portion 214. For example, the stand platform 230 may include two parallel sidewalls 254 that sideways delimit a cavity in which is slidably disposed the actuator 242, and a left and a right side edge of the actuator 242 respectively have protrusions 255 that are respectively received slidably through elongated slots 257 formed in the sidewalls 254. The elongated slots 257 can limit the travel of the protrusions 255, which thereby delimits the course of the actuator 242 relative to the stand platform 230.

The two linking assemblies 244 respectively coupling the actuator 242 with the two latches 240 can have a similar construction. According to one example of implementation, each linking assembly 244 can include a driving member 256 and a cable 258. The driving member 256 is assembled with the frame portion 214 for back and forth sliding movement, e.g., it may be slidably connected with the wheel mount 236 adjacent to the latch 240 associated therewith. Moreover, the driving member 256 can have a guide slot 260 of an elongated shape that is inclined an angle relative to the direction of sliding movement of the driving member 256. The latch 240 may be connected with the driving member 256 with the protruding pin 250 of the latch 240 slidably received through the guide slot 260 of the driving member 256. The driving member 256 and the latch 240 thereby can be movably coupled with each other, the latch 240 sliding along an axis generally perpendicular to a sliding axis of the driving member 256. For example, a sliding displacement of the driving member 256 in a first direction can drive the latch 240 to slide for engaging with the tube portion 216, and a sliding displacement of the driving member 256 in a second direction opposite to the first direction can drive the latch 240 to slide for disengaging from the tube portion 216.

Each of the two springs 246 can be assembled so as to respectively bias the corresponding latch 240 toward a locking state for engaging with the tube portion 216 of the frame portion 212. According to an example of implementation, each spring 246 can be respectively connected with the driving member 256 associated therewith and the frame portion 214. More specifically, each spring 246 can be a compression spring having a first end connected with the driving member 256, and a second end connected with the wheel mount 236 of the frame portion 214. Each spring 246 can thereby urge the driving member 256 to slide in a direction for causing the latch 240 to engage with the tube portion 216.

The two cables 258 can respectively connect the actuator 242 with the two driving members 256. Referring to FIGS. 17 and 18, each cable 258 can include a wire 262 that is slidably placed through the interior of an outer sheath 264. The wire 262 can have two ends 262A and 262B that respectively extend outside two ends 264A and 264B of the outer sheath 264. The end 262A of the wire 262 can be attached to the driving member 256 associated therewith, and the opposite end 262B can be fixedly anchored to the stand platform 230. The end 264A of the outer sheath 264 can be fixedly anchored to the frame portion 214 at a location near the driving member 256 (e.g., on the wheel mount 236), and the opposite end 264B can be attached to the actuator 242 at a rearward location relative to the end 262B of the wire 262. Each cable 258 can have at least one bend, and can be disposed such that a movement of the actuator 242 can displace a portion of the cable 258 (e.g., the outer sheath 264 can move relative to the wire 262) and modify a tension in the wire 262, which can thereby pull on the driving member 256. Accordingly, a sliding displacement of the actuator 242 relative to the frame portion 214 can pull on the two cables 258 and cause the two driving members 256 to slide against the biasing force of the springs 246, whereby the two latches 240 are respectively urged by the two driving members 256 to concurrently move for disengaging from the tube portions 216 of the frame portion 212 and thereby unlock the frame portion 214.

In the control mechanism 210, the actuator 242 may be operable to cause the two latches 240 to move concurrently for unlocking the frame portion 214. Once the frame portion 214 is unlocked, the actuator 242 may be further used to drive and urge the frame portion 214 in sliding movement relative to the frame portion 212 for modifying a distance between the wheel assemblies 220 and 232. For example, once the two latches 240 are switched to the unlocking state by an initial sliding of the actuator 242, further sliding of the actuator 242 can bring a portion of the actuator 242 in engaging contact against a predetermined location on the frame portion 214 (e.g., one or more protrusion 255 of the actuator 242 can be brought in contact with an end 257A of the corresponding elongated slot 257 provided on the sidewall 254 of the stand platform 230), such that the actuator 242 and the frame portion 214 can then slide in unison relative to the frame portion 212. Accordingly, a caregiver can continuously grasp and operate the actuator 242 for unlocking the frame portion 214 and then adjusting its position relative to the frame portion 212.

Figure 19:
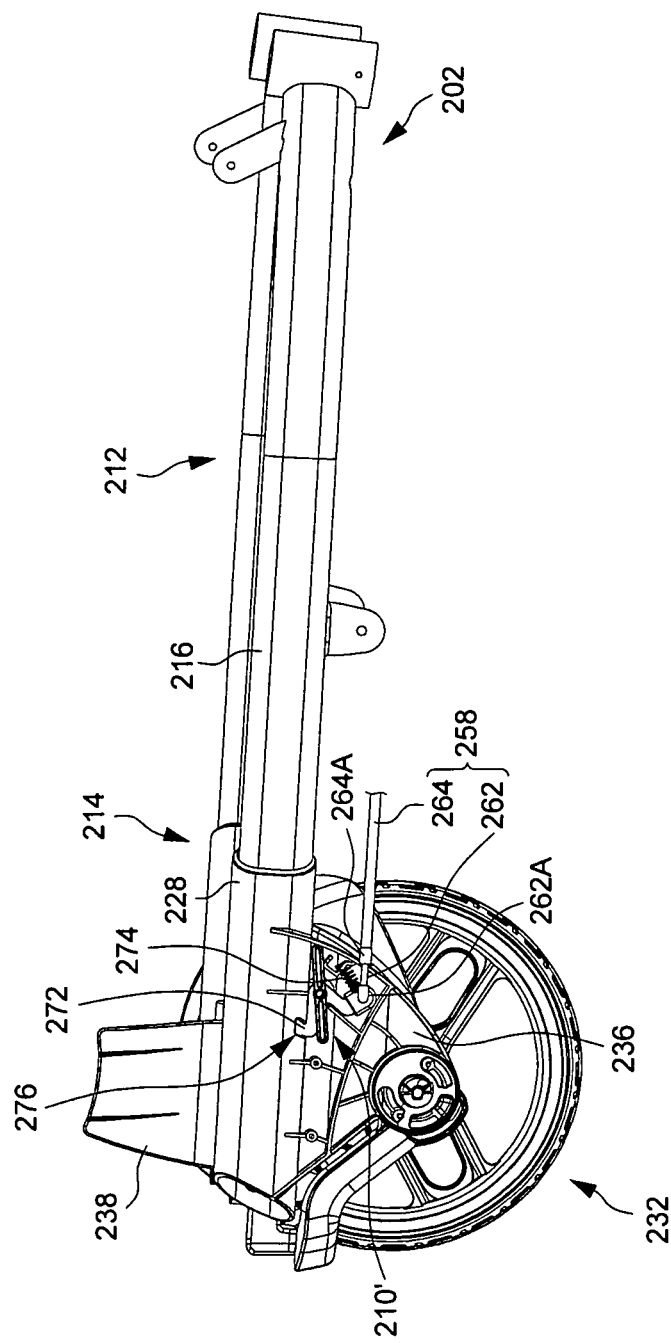
FIG. 19 is a perspective view illustrating a variant construction of the control mechanism provide on the base shown in FIG. 14.

FIG. 19 are schematic views illustrating a variant construction of a control mechanism 210' operable to unlock the frame portion 214 and adjust its position relative to the frame portion 212. The control mechanism 210' can include two latches 272, two springs 274, and two linking assemblies comprised of the cables 258 described previously. The latches 272, springs 274 and cables 258 are assembled with the frame portion 214 in a symmetric manner at the left and right sides thereof. Accordingly, FIG. 19 only illustrates the assembly at one side of the frame portion 214, the other one being identical.

Referring to FIG. 19, each latch 272 can be pivotally connected with the frame portion 214 respectively adjacent to one corresponding tube portion 228. For example, each latch 272 can be pivotally assembled with one corresponding wheel mount 236, and can rotate to extend through a hole 276 provided on the tube portion 228 for engaging with or disengaging from the tube portion 216 in the interior of the tube portion 228. Each latch 272 can thereby rotate relative to the frame portion 214 for engaging with the tube portion 216 so as to lock the frame portion 214 in position relative to the frame portion 212, and can disengage from the tube portion 216 for sliding movement of the frame portion 214 relative to the frame portion 212. Like previously described, the latch 272 may exemplary engage with an opening provided on the tube portion 216 for locking the frame portions 212 and 214 in the shortened or contracted state, and with an end edge of the tube portion 216 for locking the frame portions 212 and 214 in the expanded state.

Each spring 274 can be assembled so as to respectively bias one corresponding latch 272 toward a locking state for engaging with the tube portion 216 of the frame portion 212. According to an example of implementation, each spring 274 can have a first end connected with the corresponding latch 272, and a second end connected with the wheel mount 236 of the frame portion 214. Each spring 274 can thereby urge the latch 272 coupled thereto to rotate for engaging with the corresponding tube portion 216.

Moreover, the control mechanism 210' may further include the same actuator 242 previously described and illustrated in FIGS. 14 and 15. Each of the two cables 258 can respectively connect the actuator 242 with one corresponding latch 272 (e.g., the end 262A of the wire 262 can be attached to the latch 272, the other end of the wire 262 and the two ends of the outer sheath 264 being connected like previously described). Accordingly, a sliding displacement of the actuator 242 relative to the frame portion 214 can pull on the two cables 258 and cause the two latches 272 to rotate against the biasing force of the springs 274, whereby the two latches 272 can concurrently move for disengaging from the tube portions 216 of the frame portion 212 and thereby unlock the frame portion 214.

Like previously described, the actuator 242 of the control mechanism 210' may be operable to urge the two latches 272 to move concurrently for unlocking the frame portion 214. Once the frame portion 214 is unlocked, the actuator 242 may be further movable to drive the frame portion 214 in sliding movement relative to the frame portion 212 for shortening or expanding the base 202 in a same manner as described previously.

FIGS. 21-26 are schematic views illustrating another construction of a child stroller apparatus 300 having an expandable frame. The stroller frame 300 can include a base 302, and an upper frame portion 303 coupled to the base 102 with the upper frame portion 303 being comprised of two front or first leg portions 304, two rear or second leg portions 306 and a handle frame 308. The base 302 can include two frame portions 312 and 314. The frame portion 312 can be exemplary a front frame portion, and the frame portion 314 can be exemplary a rear frame portion. Like previously described, the two frame portions 312 and 314 are slidably assembled with each other so that the frame portion 314 can slide generally horizontally relative to the frame portion 312 along a lengthwise axis extending from a front to a rear of the child stroller apparatus 300.

The frame portion 312 can include two tube portions 316 (better shown in FIG. 23) extending generally parallel to each other at a left and a right side, and two front wheel assemblies 320 respectively assembled with the two tube portions 316. The frame portion 314 can include two first tube portions 328, two second tube portions 329 and two rear wheel assemblies 330. The two tube portions 328 can extend generally parallel to each other at the left and right sides, and can be telescopically assembled with the two tube portions 316, so that the frame portion 314 can slide relative to the frame portion 112 along the lengthwise axis Y. The two tube portions 329 are respectively attached to the tube portions 328, and extend rearward with the two rear wheel assemblies 330 respectively mounted near the rear ends of the two tube portions 329.

The leg portions 304 and 306 can be respectively disposed symmetrically at a left and a right side of the child stroller apparatus 300. The two leg portions 304 can be respectively connected pivotally with the frame portion 314 at the left and right side thereof. For example, each leg portion 304 can have a lower end pivotally connected with one corresponding tube portion 328 of the frame portion 314, whereby the leg portions 304 are rotatable relative to the frame portion 314 about a pivot axis extending transversally from a left to a right side. According to one example of construction, the pivot connection that couples each leg portion 304 with the frame portion 314 can be disposed at an intermediate location on the frame portion 314 that is closer to the rear wheel assemblies 330 than the front wheel assemblies 320.

The two leg portions 306 can be respectively connected pivotally with the frame portion 314 and the handle frame 308. For example, each leg portion 306 can have a lower end that is pivotally connected with one corresponding tube portion 329 of the frame portion 314 between the rear wheel assembly 330 and the pivot connection of the leg portion 304 with the tube portion 328, and an upper end pivotally connected with the handle frame 308. The leg portions 306 are thereby rotatable relative to the frame portion 314 and the handle frame 108.

Figure 21:
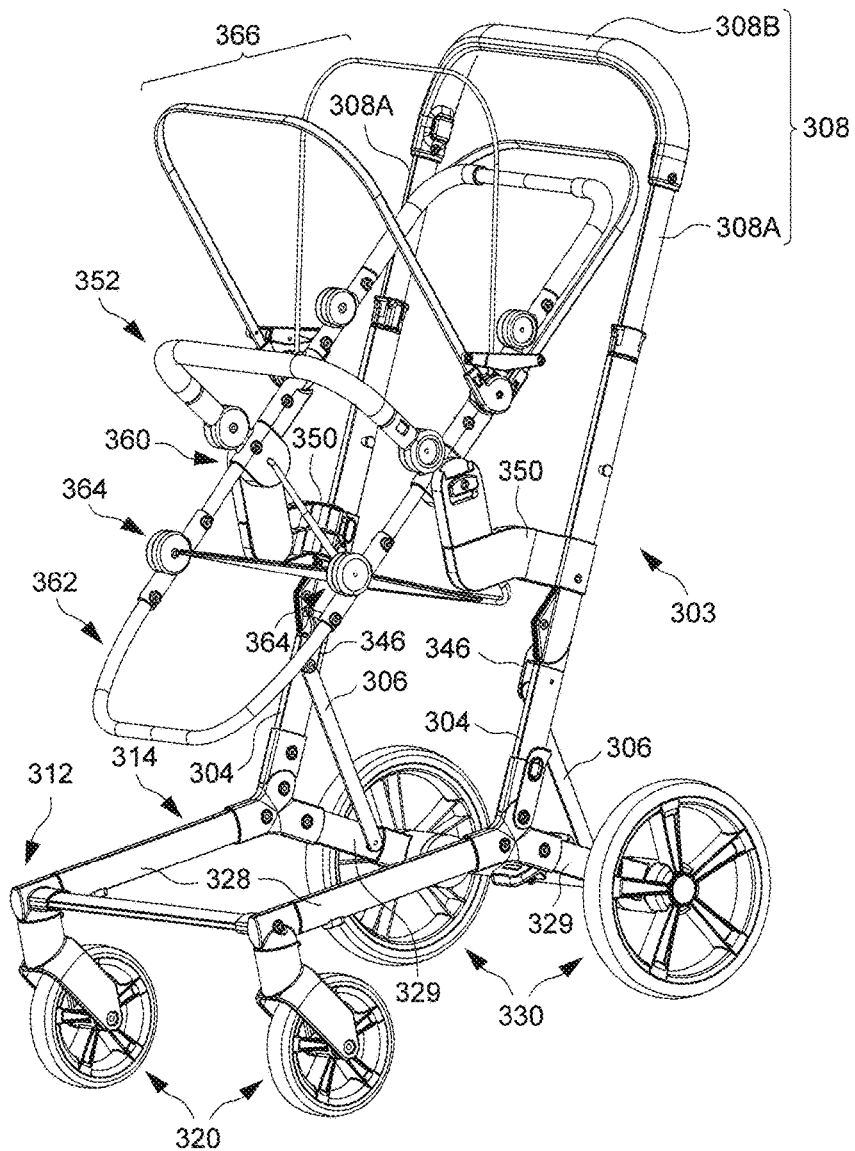
FIG. 21 is a perspective view illustrating another construction of a child stroller apparatus having an expandable frame, the child stroller apparatus being shown in a shortened state.
Figure 22:
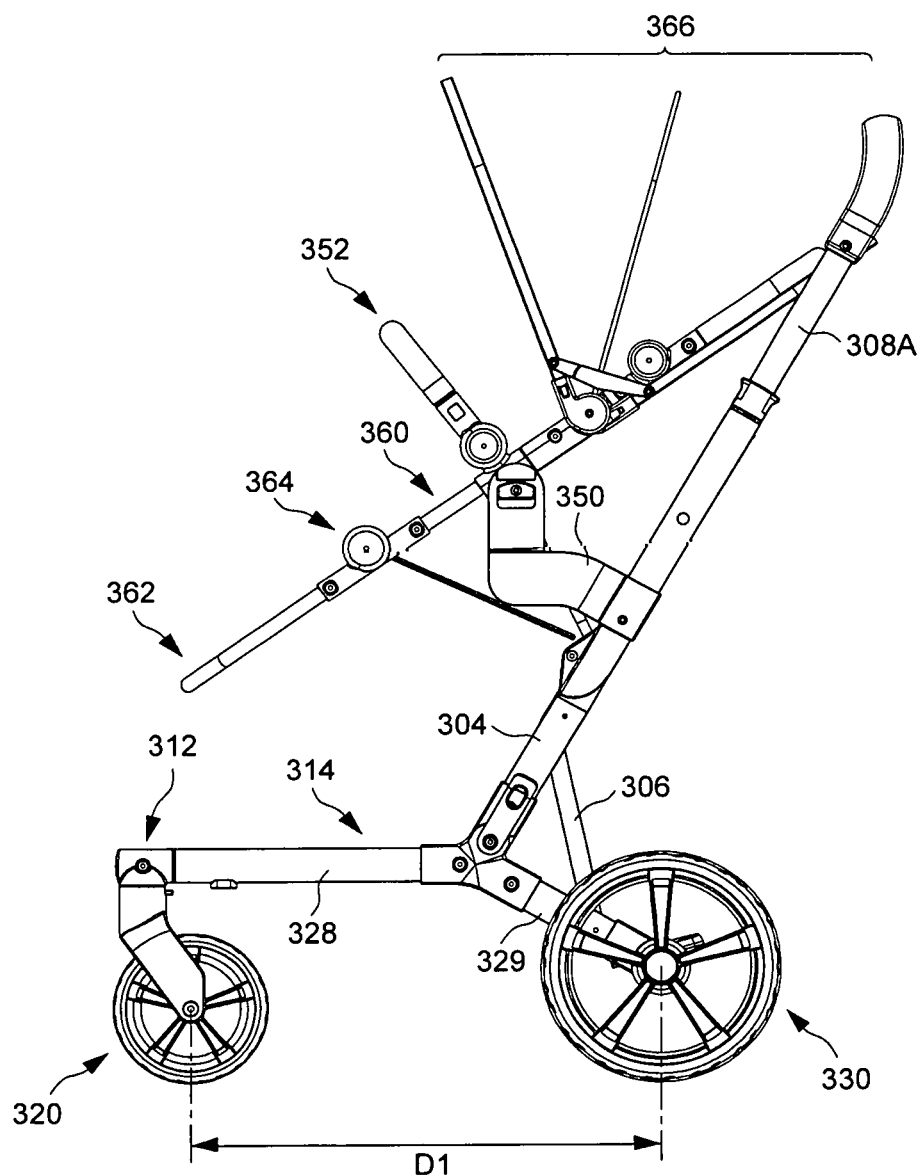
FIG. 22 is a side view of the child stroller apparatus of FIG. 21 in the shortened state.
Figure 23:
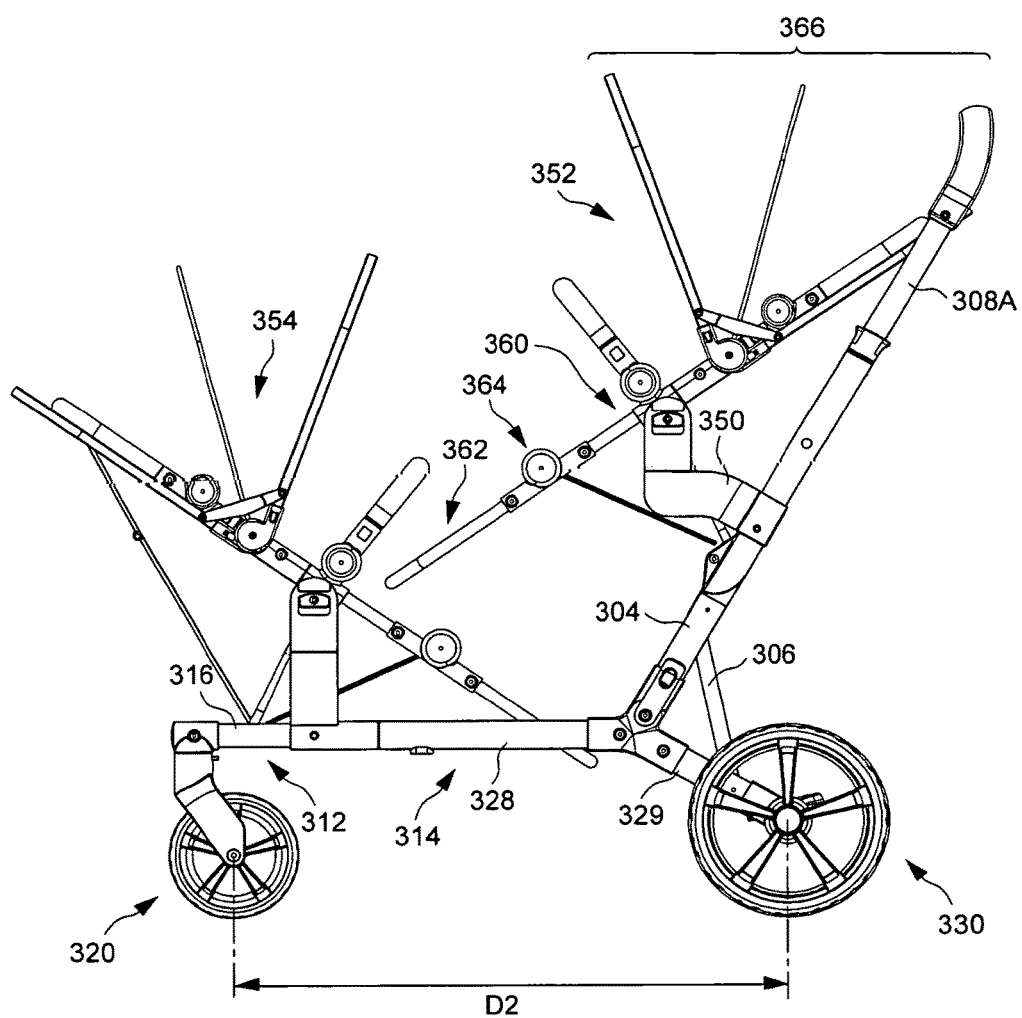
FIG. 23 is a side view of the child stroller apparatus of FIG. 21 in an expanded state.

Referring to FIGS. 21 and 22, the handle frame 308 can include two side segments 308A and a transversal segment 308B connected with each other, like previously described. At each of the left and right sides, the side segment 308A of the handle frame 308 can be respectively connected pivotally with one leg portion 304 and one leg portion 306 about different pivot axes. For example, the side segment 308A can have a lower end pivotally connected with the upper end of the leg portion 304 about a first pivot axis, and can be fixedly connected with a linking arm 346 that is pivotally connected with the upper end of the leg portion 306 about a second pivot axis offset from the first pivot axis.

Moreover, each side segment 308A of the handle frame 308 can be respectively assembled with a seat mount 350 configured to detachably engage with a seat 352, which may be a stroller seat or an infant car seat. The two seat mounts 350 can be assembled symmetrically with the two side segments 308A of the handle frame 308, and may be further movably adjusted along the two side segments 308A as desired.

In the child stroller apparatus 300, the frame portion 314 can slide relative to the frame portion 312 to increase or reduce a lengthwise distance between the front wheel assemblies 320 and the rear wheel assemblies 330, according to the needs. For example, when the child stroller apparatus 100 is used for transporting only one child on the seat 352 installed on the seat mounts 350, the frame portions 312 and 314 can be adjusted to set a distance D1 between the front wheel assemblies 320 and the rear wheel assemblies 330 for shortening the base 302 (better shown in FIGS. 21 and 22). When the child stroller apparatus 300 is used for transporting two children, the frame portion 314 can slide rearward relative to the frame portion 312 to set a distance D2 between the front wheel assemblies 320 and the rear wheel assemblies 330 (better shown in FIG. 23) that is greater than the distance D1, thereby providing more room for the installation of another seat 354 on the frame portion 312 in addition to the seat 352.

Figure 24:
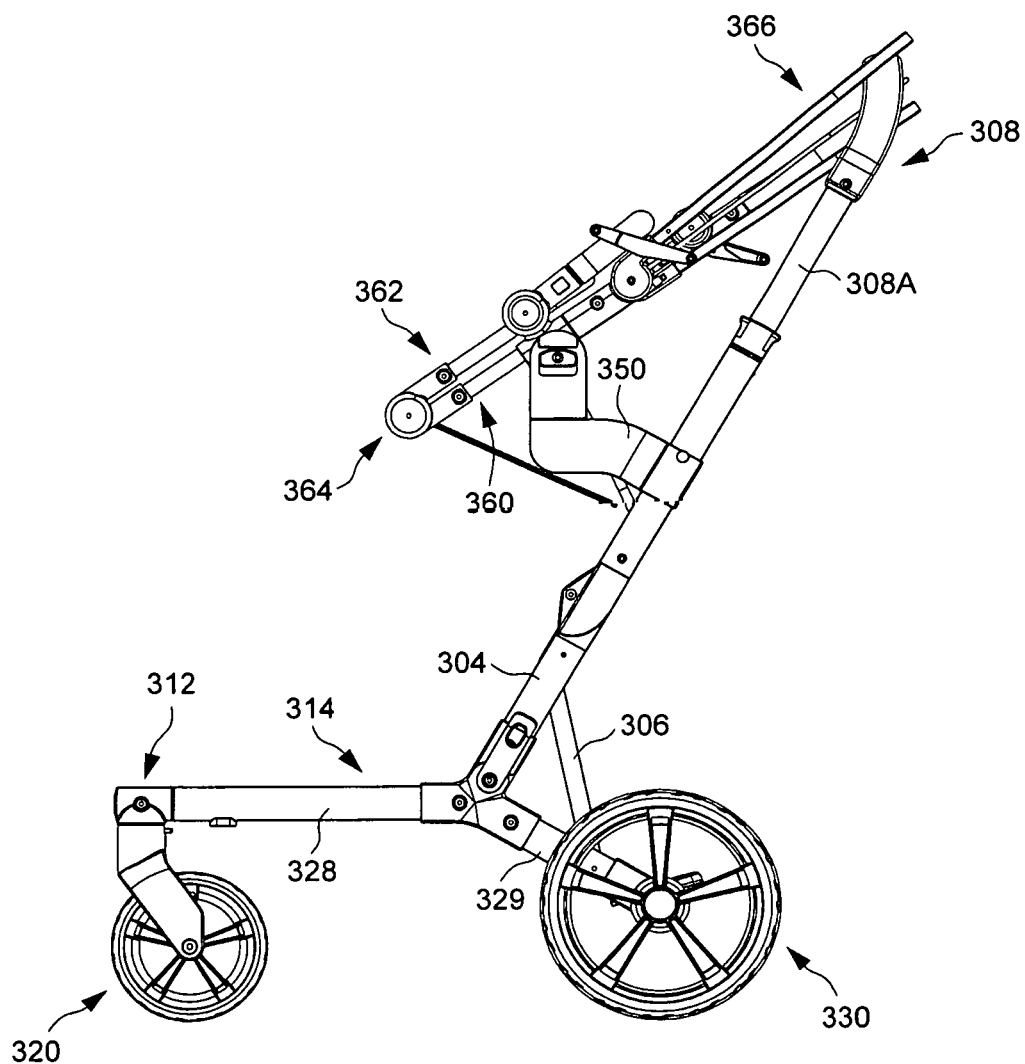
FIG. 24 is a side view of the child stroller apparatus of FIG. 21 with a seat installed thereon in a folded state.
Figure 25:
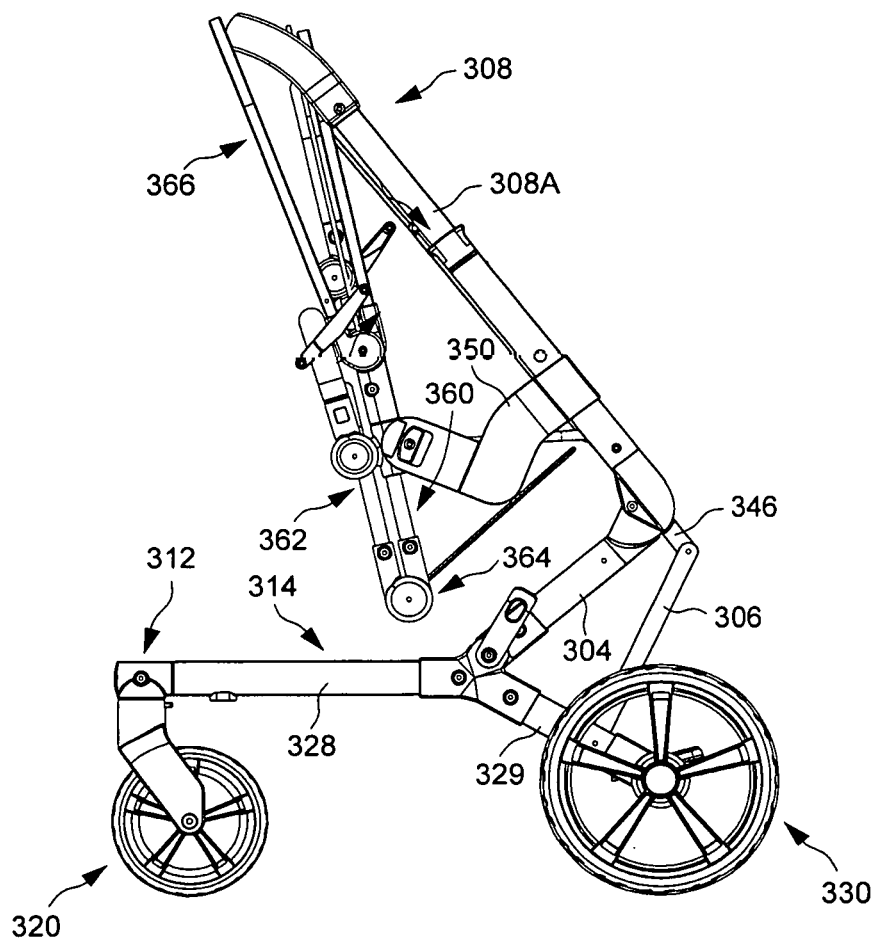
FIG. 25 is a side view of the child stroller apparatus of FIG. 21 in an intermediate stage during its folding.
Figure 26:
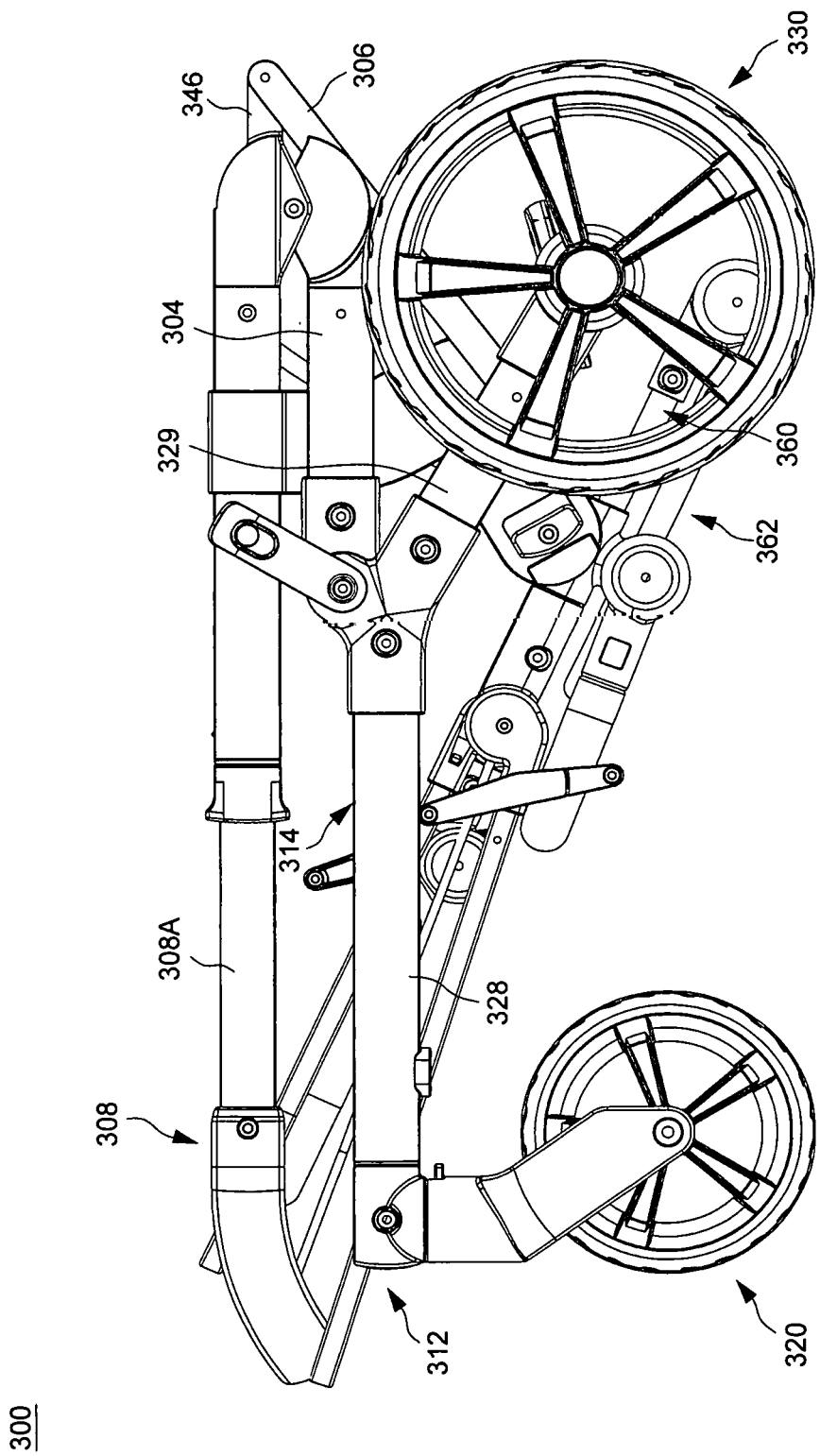
FIG. 26 is side view of the child stroller apparatus of FIG. 21 in a collapsed state.

In conjunction with FIGS. 21 and 22, FIGS. 24-26 are schematic views further illustrating exemplary operation for collapsing the child stroller apparatus 300. As shown in FIGS. 24-26, the child stroller apparatus 300 may be collapsed with the seat 352 installed on the seat mounts 350. According to an example of construction, the seat 352 may be a stroller seat, and can have an upper and a lower frame portion 360 and 362 pivotally connected with each other about two pivot joints 364. Moreover, the seat 352 can include a canopy frame 366 that is assembled with the upper frame portion 360. For collapsing the child stroller apparatus 300, the lower frame portion 362 can be folded over the upper frame portion 360 by rotation about the pivot joints 364 so as to reduce the size of the seat 352, and the canopy frame 366 can also be collapsed close to the upper frame portion 360, whereby the collapsed seat 352 can have a compact size. Moreover, the seat mounts 350 with the collapsed seat 352 thereon can be adjusted to an upward position along the side segments 308A of the handle frame 308. This configuration is shown in FIG. 24. Then the handle frame 308 can be collapsed forward until it lies adjacent to the base 302, as shown in FIGS. 25 and 26.

Advantages of the child stroller apparatuses described herein include the ability to provide a stroller frame that can be expanded and shortened during use according to the needs. For example, the expanded stroller frame can offer a greater volume for the installation of multiple seats, or for a larger storage basket. In other words, the child stroller apparatus can be converted to different configurations of use according to the caregiver's needs. Moreover, the child stroller apparatus can include a control mechanism that is easy to operate for adjusting the child stroller apparatus between the expanded state the shortened state.

Realizations of the child stroller apparatuses have been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A child stroller apparatus comprising:
  a first frame portion provided with a first wheel assembly;
  a second frame portion provided with a second wheel assembly, the second frame portion being assembled with the first frame portion for sliding movement along a lengthwise axis extending from a front to a rear of the child stroller apparatus; and
  an expandable storage basket spanning across the first and second frame portions, wherein the storage basket includes a first and a second basket frame portion respectively attached to the first and second frame portion, the first and second basket frame portions being movable away or toward each other for expanding or contracting the storage basket as the second frame portion slides relative to the first frame portion for increasing or reducing a distance between the first and second wheel assemblies.

2. The child stroller apparatus according to claim 1, wherein the storage basket further includes an elastic member respectively connected with the first and second basket frame portions.

3. The child stroller apparatus according to claim 2, wherein the elastic member is stretched when the second frame portion moves relative to the first frame portion for increasing a distance between the first and second wheel assemblies.

4. The child stroller apparatus according to claim 2, wherein the elastic member is a spring having two ends respectively anchored with the first and second basket frame portions.

5. The child stroller apparatus according to claim 2, wherein the elastic member is disposed at one of a left and a right side of the storage basket.

6. The child stroller apparatus according to claim 1, wherein the first basket frame portion includes a rigid panel and/or a rod disposed at one end of the storage basket, and the second basket frame portion includes an elongated rod segment for defining an upper rim of the storage basket.

7. The child stroller apparatus according to claim 1, wherein the storage basket further includes a softgoods material attached to the second basket frame portion for defining at least partially an enclosure of the storage basket.

8. The child stroller apparatus according to claim 1, wherein the storage basket further includes a flexible panel respectively connected with the first and second basket frame portions.

9. The child stroller apparatus according to claim 1, wherein the first frame portion is a front frame portion, and the second frame portion is a rear frame portion.

10. The child stroller apparatus according to claim 9, further including a first and a second leg portion, a handle frame having a side segment, and a joint structure, the first and second leg portions being respectively connected pivotally with the first frame portion, and the side segment of the handle frame being connected with the first and second leg portions via the joint structure.

11. The child stroller apparatus according to claim 9, further including a control mechanism operable to adjust a position of the second frame portion relative to the first frame portion, the control mechanism including an actuator assembled with the first frame portion, and a linkage respectively connected with the actuator and the second frame portion, the actuator being operable to drive the second frame portion in sliding movement relative to the first frame portion for increasing or reducing a distance between the first and second wheel assemblies.

12. The child stroller apparatus according to claim 11, wherein the first frame portion has a footrest, and the actuator is disposed adjacent to the footrest.

13. A child stroller apparatus comprising:
a first frame portion provided with a first wheel assembly;
a second frame portion provided with a second wheel assembly, the second frame portion being assembled with the first frame portion for sliding movement along a lengthwise axis extending from a front to a rear of the child stroller apparatus; and
a storage basket spanning across the first and second frame portions, wherein the storage basket includes a basket frame portion connected with the second frame portion, and a softgoods material connected with the basket frame portion and defining a sidewall of the storage basket, the basket frame portion being movable relative to the second frame portion between a first position for expanding the sidewall and a second position for collapsing the sidewall.

14. The child stroller apparatus according to claim 13, wherein the storage basket is movable along with the second frame portion relative to the first frame portion.

15. The child stroller apparatus according to claim 13, wherein the basket frame portion projects rearward and upward above the first and second frame portions in the first position, and is displaced downward to the second position.

16. The child stroller apparatus according to claim 13, wherein the basket frame portion has a generally U-shape having two ends movably connected with the second frame portion.

17. The child stroller apparatus according to claim 13, wherein the basket frame portion is connected with the second frame portion via a spring, the spring biasing the basket frame portion toward the first position.

18. The child stroller apparatus according to claim 13, wherein the first frame portion includes two first tube portions, and the second frame portion includes two second tube portions and an inner frame member fixedly connected with the two second tube portions, the two first tube portions being respectively assembled telescopically with the two second tube portions, and the basket frame portion being movably connected with the inner frame member.

19. The child stroller apparatus according to claim 18, further including a control mechanism operable to adjust a position of the second frame portion relative to the first frame portion, the control mechanism including an actuator assembled with the first frame portion, and a linkage respectively connected with the actuator and the inner frame member of the second frame portion, the actuator being operable to drive the second frame portion in sliding movement relative to the first frame portion for increasing or reducing a distance between the first and second wheel assemblies.

20. The child stroller apparatus according to claim 13, wherein the second frame portion includes a seat mount, when a seat is installed on the seat mount the basket frame portion being displaced to the second position at an underside of the seat.

* * * * *